US011737462B2

(12) United States Patent
Dakshanamurthy et al.

(10) Patent No.: US 11,737,462 B2
(45) Date of Patent: Aug. 29, 2023

(54) METHODS FOR MODULATING PLANT RESPONSE TO ENVIRONMENTALLY-INDUCED STRESS

(71) Applicants: Howard University, Washington, DC (US); Georgetown University, Washington, DC (US)

(72) Inventors: Sivanesan Dakshanamurthy, Herndon, VA (US); Hemayet Ullah, Gaithersburg, MD (US)

(73) Assignees: HOWARD UNIVERSITY, Washington, DC (US); GEORGETOWN UNIVERSITY, Washington, DC (US)

( * ) Notice: Subject to any disclaimer, the term of this patent is extended or adjusted under 35 U.S.C. 154(b) by 0 days.

(21) Appl. No.: 16/122,712

(22) Filed: Sep. 5, 2018

(65) Prior Publication Data
US 2018/0360043 A1    Dec. 20, 2018

Related U.S. Application Data

(63) Continuation of application No. 14/390,743, filed as application No. PCT/US2013/032496 on Mar. 15, 2013.

(60) Provisional application No. 61/620,874, filed on Apr. 5, 2012.

(51) Int. Cl.
*A01N 43/653*    (2006.01)
*A01N 43/38*     (2006.01)

(52) U.S. Cl.
CPC ........... *A01N 43/653* (2013.01); *A01N 43/38* (2013.01)

(58) Field of Classification Search
None
See application file for complete search history.

(56) References Cited

U.S. PATENT DOCUMENTS

| | | | |
|---|---|---|---|
| 6,169,057 | B1 | 1/2001 | Lovatt |
| 2005/0288347 | A1 | 12/2005 | Hodge et al. |
| 2010/0144525 | A1 | 6/2010 | Frank et al. |
| 2010/0173900 | A1 | 7/2010 | Koehle et al. |
| 2011/0055979 | A1 | 3/2011 | de Costa e Silva et al. |
| 2011/0195841 | A1 | 8/2011 | Dittgen et al. |

FOREIGN PATENT DOCUMENTS

| | | |
|---|---|---|
| WO | 2006/105477 A1 | 10/2006 |
| WO | 2009/003953 A2 | 1/2009 |
| WO | 2010/015337 A1 | 2/2010 |

OTHER PUBLICATIONS

Slate "Root Causes" http://www.slate.com/articles/news_and_politics/gardening/2006/10/root_causes.html, Oct. 31, 2006, no pagination (Year: 2006), Casey, Constance.
Colanceska-Ragenovic, K.; Dimova, V.; et al. "Synthesis, Antibacterial, and Antifungal activity of 4-substituted-5-Aryl-1,2,4-Triazoles" Molecules, 2001, v. 6, pp. 815-824. (Year: 2001).
Ming-Xia Liu et al., Spectochimica Acta Part A, 79: 1837-1842 (2011).
Khan et al., Monatsh Chem., 141:479-484 (2010).
Mohan, Indian Journal of Chemistry, 41 B:403-406 (Feb. 2002).
Cheeseright et al., J. Med. Chem., 52:4200-4209 (2009).
Hong et al., "Inhibition of trans-Cinnamate 4-Hydroxylase by 4-Amino-5-aryl-2,3=dihydro-3H-1,2,4-triazole-3-thiones," 2005; J. Pestic. Sci., 30(4):406-408.
H. Ullah et al., "Tyrosine Phosphorylation Based Summoylation of *Arabidopsis* RACK 1A Protein Potentially Dictates the Oxidative Stress Signaling Pathways," American Society of Plant Biologists; Sep. 16, 2011;http://www.biology.howard.edu/faculty/facultybios/Ullah.htm.
A. Yemets et al., "Effects of tyrosine kinase and phosphatase inhiibitors on microtubules in *Arabidopsis* root cells," Jan. 14, 2008; Cell Biology International, 32:630-637.
H. Ullah et al., "Structure of a signal transduction regulator, RACK 1, from *Arabidopsis thaliana*," Jun. 25, 2008, Protein Science, 17:1771-1780.
Supplementary European Search Report dated Apr. 16, 2016, issued re EP Application 13772959.6.
Berova et al., Bulgarian Journal of Plant Physiology, 28:75-84 (Jan. 1, 2002).
Lin et al., Botanical Studies, 49:9-18 (Jan. 1, 2008).
International Search Report dated Jul. 10, 2013, issued in International Application PCT/US2013/032496.
Written Opinion of the International Searching Authority dated Jul. 10, 2013, issued in International Application PCT/US2013/032496.
Sung et al. "Synthesis of [(4,5-Disubstituted-4.H-1,2,4-triazol-3-yl)thio]alkanoic Acids and Their Analogues as Possible Antiinflammatory Agents" Journal of Heterocyclic Chemistry 1992.
Sung et al.. Synthesis of [(4,5-Disubstituted-4H-1,2,4-triazol-3-yl)thio]alkanoic Acids and Their Analogues as Possible Antiinflammatory Agents, J. Heterocyclic Chemistry, 29:1101-1109 (Aug.-Sep. 1992).

(Continued)

*Primary Examiner* — Alton N Pryor
(74) *Attorney, Agent, or Firm* — Sughrue Mion, PLLC

(57) ABSTRACT

Compounds and methods are described herein that are effective to modulate plant response (e.g., plant susceptibility) to environmentally-induced stress. The compounds and methods described herein advantageously may be used to modulate environmental stress resistance in a wide variety of plants. Environmental stresses include, for example, high light intensity (UV exposure), temperature (e.g., high heat), high soil salinity, and low soil moisture (e.g., drought). As used herein, environmental stresses include any conditions that result in increased generation of reactive oxygen species (ROS) and accumulation of ROS in the plant cells. The compounds described herein that are effective to modulate resistance to the stress prevent, directly or indirectly, or increase phosphorylation of Tyr$^{248}$ of the RACK1A protein.

12 Claims, 16 Drawing Sheets

Specification includes a Sequence Listing.

(56) References Cited

OTHER PUBLICATIONS

Yamada et al., 5-Aryl-1,3,4-oxadiazxole-2-thiols as a New Series of trans-Cinnamate 4-hydroxylase Inhibitors, J. Pest. Sci., 29(3):205-208 (2004).
Communication, dated Dec. 11, 2020, issued by the Canadian Intellectual Property Office in counterpart Canadian Patent Application No. 2,869,567.

2 weeks in 150 mM salt 8 h of light/day at 22C
Upper panel: at 0 days
lower panel: After 14 days

SD-29 prevents Y248 phosphorylation under heat stress

(A)

(B)

Yeast AA cells O/N with SD-29 analogs

```
   1 ttctttgtat tccgcctcc cccgagaaaa cgaaaaccct agtttcagag gcatctccag
  61 acaccgaaaa tggcggaagg actcgttttg aagggcacca tgcgtgcaca cactgacatg
 121 gtgacggcaa tcgccacccc aatcgataac gcagacatca tcgtctcagc ttcccgcgac
 181 aaatccatca ttttgtggaa actcaccaag gacgacaaag cctacggtgt agctcagagg
 241 cgtctcactg gtcactctca cttcgttgag gatgttgttc tctcctccga tggacaattc
 301 gcgctttccg gcagctggga cggcgagctc cgtctttggg atcttgctgc tggtgtctcc
 361 actcgtagat tcgttggaca caccaaggac gtgctctccg tcgccttctc actcgacaac
 421 cgtcagatcg tctctgcatc tcgtgaccgt acgatcaagc tgtggaacac tcttggtgag
 481 tgcaagtaca ccatttcaga aggtggtgag ggacaccgtg attgggttag ctgcgtcaga
 541 ttcagcccta acacgcttca gccgacgatt gtatctgctt cgtgggacaa gaccgtgaaa
 601 gtgtggaacc tttcgaactg caagctcaga tcgactcttg ctggtcacac cggttacgtg
 661 agcactgtgg ctgtatcacc tgatggttct ctttgtgcaa gtggaggcaa agacggtgtt
 721 gttttgctgt gggatttggc tgaggggaag aagctttact ctcttgaagc taactctgtg
 781 atccatgctc tttgcttcag tcccaacagg tactggctct gtgctgcaac tgaacatggt
 841 attaagattt gggaccttga gagcaagagc attgttgagg atttgaaggt tgatctcaag
 901 gctgaggctg aaaaggctga caacagtggt cctgctgcca ccaagaggaa ggttatttac
 961 tgcacaagcc ttaactggag cgctgatgga agcaccctct tcagtggtta caccgatgga
1021 gtcattagag tttggggtat tggtcgttac tagtaatctc atcacttgtg ctgtcgttgc
1081 tctctgctat ctgcttgttg gttttatcta tcacttatgt ttttatcgac aactcatgaa
1141 gtaccttgag gttttggaa ggatgtttgt tttcttgtca atctaggttt ttgcttcttt
1201 atcttatcgt tcgagatctt ggttttaga gttacttctc ccgaaaaaaa aaaaaaaaa
```

FIG. 20

```
  1 maeglvlkgt mrahtdmvta iatpidnadi ivsasrdksi ilwkltkddk aygvaqrrlt
 61 ghshfvedvv lssdgqfals gswdgelrlw dlaagvstrr fvghtkdvls vafsldnrqi
121 vsasrdrtik lwntlgecky tiseggeghr dwvscvrfsp ntlqptivsa swdktvkvwn
181 lsncklrstl aghtgyvstv avspdgslca sggkdgvvll wdlaegkkly sleansviha
241 lcfspnrywl caatehgiki wdlesksive dlkvdlkaea ekadnsgpaa tkrkviycts
301 lnwsadgstl fsgytdgvir vwgigry
```

FIG. 21

METHODS FOR MODULATING PLANT RESPONSE TO ENVIRONMENTALLY-INDUCED STRESS

CROSS-REFERENCE TO RELATED APPLICATION

This application claims the benefit of U.S. Provisional Application No. 61/620,874, filed Apr. 5, 2012, which is incorporated herein by reference in its entirety.

FIELD

The present inventions generally relate to compounds and to methods of modulating plant response to environmentally-induced stress.

BACKGROUND

The increasing world population and the diminishing supply of arable land available for agriculture fuels agricultural research towards improving the efficiency of crop growing. Conventional means for crop and horticultural progress utilize selective breeding methods to identify plants having desirable characteristics. However, these selective breeding practices have several disadvantages, namely that these methods generally are labor intensive and result in plants that often contain heterogeneous genetic components that may not always result in the advantageous trait being passed on from parent plants.

Advances in molecular genetics have allowed scientists to modify the genetic makeup of plants. Genetic modifications of plants demand the isolation and manipulation of genetic material (DNA or RNA) and the subsequent engineering of that genetic material into a plant. Such expertise has the capacity to convey crops or plants having specifically improved economic, agronomic or horticultural properties. However, objections to such improvements and use of transgenic crops rest on several issues relating to the balance of associated risks and advantages. Most crops have been engineered to withstand herbicide application and there is much debate on whether this will lead to more or less herbicide being applied to crops, which types of herbicide (in terms of environmental responsiveness) will be useful, the consequence of herbicide residues, and the chance of herbicide resistance developing in target species and their genes being in turn passed on to non-target related crops to produce invasive herbicide resistant weeds. There is sufficient evidence that transgenic crops and their genes, through pollen distribution, can spread even between species that are mostly inbreeders.

Alternatively, identification of new chemicals that have high likelihood of binding to a target protein to elicit preferred biological response is in the vanguard of the drug discovery process. Researchers are increasingly using both ligand- and receptor-based techniques for virtual screening of small compound libraries for chemical inhibitors/agonists of cellular targeted domains (Villoutreix, et al., Current Protein & Peptide Science, 8: 381-411 (2009); Schneider et al., Nature Reviews Drug Discovery, 9: 273-276 (2010)). The availability of a huge number of three-dimensional protein structures, mainly in non-plant systems, is permitting computational tools to powerfully screen for lead molecules that will bind tightly to functionally defined domains within a target protein. Though structure based virtual screening for small compounds is frequently used for drug discovery in mammalian disease systems (Vilar et al., J. Mol. Graph Model, April 29(6): 809-817 (2011)), examples of similar applications to find small compounds for controlling a particular physiological process in plant system are very rare. One limitation is that accessibility of functionally characterized protein crystal structures in plants is limited in number compared to the non-plant systems. Though homology model derived 3D-structures of functionally related proteins can be used to screen for lead compounds, the availability of high resolution crystal structure of proteins within a key physiological process can be an excellent basis for producing effective agonist/inhibitor compounds (Vilar et al.).

Like lead molecules in drug engineering, opportunities exist to detect and identify small chemical compounds to facilitate the protection of crops from diverse environmental stresses and pathogens, in addition to treatment of developmental disorders correlated to functionally characterized crystal structure of proteins involved in specific pathways. For example, the structural insight developed from the recently crystallized phytohormone brassinosteroid (BR) bound BRI1 (brassinosteroid-insensitive 1) receptor protein (She et al., Nature 12:472-476 (2011); Hothorn et al., Genes Dev. 25(3):232-237 (2011)), can now provide a useful resource to identify lead compounds that can potentially modulate the BR mediated physiological pathways.

Due to the increasingly unpredictable climatic conditions, plants are often faced with adverse environmental stresses like high salt conditions, drought, cold, high heat, UV light, and oxygen deprivation. A substantial level of crop loss due to environmental stresses is a great worry not only for the farmers but also for consumers. Finding small chemical molecules to modulate specific environmental stress response will assist in mitigating the undesirable effect on the crop loss aspect. In silico research has been applied to whole cell analysis and has the potential to speed the rate of discovery while reducing the need for some aspects of time consuming laboratory work. These in silico derived compounds, through appropriate chemistry, can provide a way to combat high salt conditions created during an extended high salt enviroment.

Scaffold protein RACK1 (Receptor for Activating C Kinase 1) in metazoan plays a foremost role in regulating different signal transduction pathways ranging from cell division to ion channel regulation by interacting with diverse proteins (McCahill et al., Mol. Pharmacol, 62: 1261-1273 (2002); Alfarano, C. et al., Nucleic Acids Res., 33: D418-D424 (2005); Sklan, et al., Prog. Neurobiol, 78: 117-134 (2006)). The identification of RACK1 as an essential component of the eukaryotic 40S ribosomal subunit implies that its signaling role has the capacity to directly modulate the efficiency and specificity of translation as well (Link A J et al., Nat Biotechnol 17: 676-682 (1999); Coyle et al., Molecular Cellular Biology, 29:1626-1634 (2008); Guo et al., Plant Physiology, 155:370-383 (2011)). The protein was identified through its ability to perform as a scaffold protein, stabilizing signaling complexes involving protein kinase C (Mochly-Rosen et al., Science 268:247-251 (1995)). RACK1 proteins have seven WD-40 repeats. WD is a short structural motif of approximately 40 amino acids, often terminating in a tryptophan-aspartic acid (W-D) dipeptide. These repeats interact to create a protein domain called the WD domain. WD-40 repeats are highly conserved (70-80% at the protein level) in wide range of species, including plants, humans, rats, chickens, flies, nematodes, algae, and yeast.

*Arabidopsis* RACK1 is a WD-repeat family protein and is predicted to have a beta (β)-propeller architecture with seven blades, similar to the heterotrimeric G-protein beta (β) subunit. The WD-repeat (also known as the WD or beta-transducin repeat) is a short structural motif of approximately 40 amino acids, often terminating in a tryptophan-aspartic acid (W-D) dipeptide. Several of these repeats are combined to form a type of protein domain called the WD domain. WD-containing proteins have four to sixteen repeating units, all of which are thought to form a circularized beta-propeller structure. WD-repeat proteins are a large family found in all eukaryotes and are implicated in a variety of functions ranging from signal transduction and transcription regulation to cell cycle control and apoptosis.

The *Arabidopsis thaliana* genome maintains three different RACK1 genes termed RACK1A, RACK1B, and RACK1C. RACK1B and RACK1C share 87% and 93% sequence identity, respectively, to RACK1A. As rack1a knock-out plants show a distinct phenotype (Chen et al., J. Exp. Bot., 57: 2697-2708 (2006); Ullah et al., Protein Sci, 17: 1771-1780 (2008)), it is expected that all three genes do not act redundantly—each gene can potentially regulate distinct signaling pathways (Ullah et al.). In initial evidence, potential heterodimer formation exists among the three RACK1 proteins. It is expected that in silico targeted compounds can potentially regulate the RACK1 heterodimerization formation and effect physiological processes.

Conforming to the earlier publication of a role in drought stress signaling (Ullah et al.), recently Chen has shown that RACK1A negatively regulates stress hormone abscisic acid (ABA) responses in *Arabidopsis* (Chen, et al. J. Exp. Bot., 57: 2697-2708 (2006). RACK1 in rice is believed to be involved with the small G-protein-Rac/Rop mediated innate immunity pathway (Nakashima et al., Plant Cell, 20:2265-2279 (2008)). In addition, it is known that one of the two rice RACK1s, by interacting with NADPH oxidase, plays a key role in the manufacturing of cellular reactive oxygen species (ROS).

Recently the first crystal structure of a RACK1A protein has been reported from *Arabidopsis thaliana* at 2.4 Å resolution. This is the first known RACK1A crystal structure from any organism (Ullah et al.). The structure revealed the surface residues that are implicated in critical roles in protein-protein interactions and identified the surface location of proposed post-translationally modified residues. The post-translational modifications of RACK1A in key residues (tyrosine phosphorylation and sumoylation) have been shown to play a key role in regulating the cellular oxidative stress responses through homodimerization of the proteins.

There is a need for a new approach to generating high salt resistant plants by identifying the target of an essential high salt resistant gene and designing small molecules to inhibit the targeting motif interactions. The new approach should yield plants and/or seeds which are high salt resistant via RACK1A protein manipulation by chemical agents which can be applied to a plant to trigger the high salt resistant response with fewer side effects. Alternatively, agonist compounds of the RACK1A Tyr$^{248}$ phosphorylation would induce plant stress leading to accelerated plant death.

BRIEF DESCRIPTION OF THE DRAWINGS

The foregoing features, as well as other features, will become apparent with reference to the description and figures below, and in which:

FIG. 20 shows the sequence of *Arabidopsis thaliana* putative WD-40 repeat protein (At1g18080) mRNA, complete cds.

FIG. 21 shows the amino acid sequence of putative WD-40 repeat protein (*Arabidopsis thaliana*).

DETAILED DESCRIPTION

Figure 1:
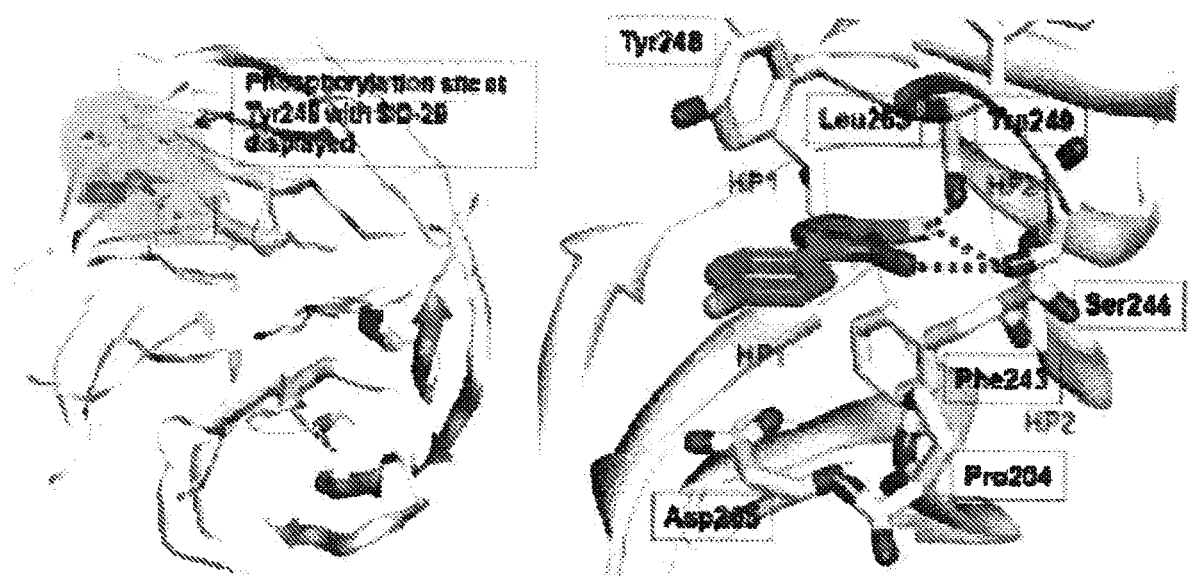
FIG. 1 is a drawing of the docked model of RACK1A with SD-29 at the Y248 phosphorylation pocket.

Compounds and methods are described herein that are effective to modulate plant response (e.g., plant susceptibility) to environmentally-induced stress. The compounds and methods described herein advantageously may be used to modulate environmental stress resistance in a wide variety of plants. Environmental stresses include, for example, high light intensity (UV exposure), temperature (e.g., high heat), high soil salinity, and low soil moisture (e.g., drought). As used herein, environmental stresses include any conditions that result in increased generation of reactive oxygen species (ROS) and accumulation of ROS in the plant cells. Oxidative stress, as a result of ROS accumulation, causes damage to a number of cellular components, including DNA, protein, and lipids, and can ultimately lead to cell and plant death. Each type of plant may be more or less susceptible to each of the various environmental stresses.

In one approach, modulation can result in resistance to the stress and prolong the plant's viability under the environmental conditions causing the stress or, in another approach, may result in promoting plant death by increasing the plant's susceptibility to the stress. The compounds described herein that are effective to modulate resistance to the stress is believed to be a result of the compound preventing, directly or indirectly, or increasing phosphorylation of $Tyr^{248}$ of the RACK1A protein. The mRNA and amino acid sequences for *Arabidopsis thaliana* RACK1A are shown in FIGS. 20 and 21. Because RACK1A is highly conserved among plants, and even among other eukaryotes, the compounds and methods described herein are effective for a wide variety of plants.

In one aspect, compounds described herein prevent $Tyr^{248}$ phosphorylation of the RACK1A protein, which interferes with RACK1A function. For example, RACK1A regulates a wide range of cellular functions resulting from high salt environment, such as ion channel regulation, production/effect of reactive oxygen species (ROS), interaction with NADPH oxidase, and up-regulation of superoxide dismutase (SOD) activity. For example, as demonstrated herein, compounds in accordance with the present disclosure that are effective to induce resistance from stress caused by a high salt environment cause increased superoxide dismutase (SOD) activity, prevent accumulation of reactive oxygen species (ROS), and decrease the uptake of sodium ions from the high salt environment, particularly during seed germination. In one approach, stress resistance or susceptibility in a plant concerns high salt resistance or susceptibility to high salt environments. A high salt concentration can induce production of ROS in plant root tips.

Conversely, compounds described herein that are effective to increase a plant's susceptibility to an environmental stress, such as soil salt content, is believed to be a result of increasing $Tyr^{248}$ phosphorylation of the RACK1A protein, thereby affecting biochemical stress-related pathways which result in accelerated plant death (i.e., herbicidal effect). Further, compounds described herein may be effective to increase a plant's susceptibility to one environmental stress while having the opposite effect (i.e., a resistance inducing effect) for another environmental stress. For example, it has been found that SD-29-12 described herein induces salt sensitivity but does not induce heat sensitivity when applied to a plant.

By one approach, the compounds described herein advantageously include a triazole-containing ring structure having a hydrophobic group and a donor/acceptor group separated on the triazole-containing ring structure by a nitrogen substituted with a hydrophilic moiety. The compounds having a triazole-containing ring structure generally have one of the general formulas shown below:

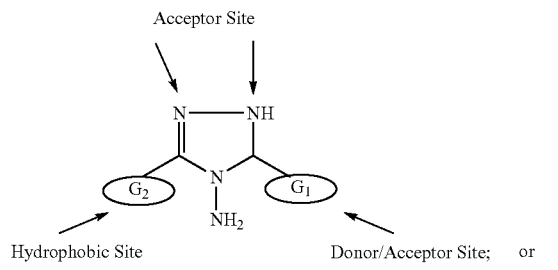

General formula (A)

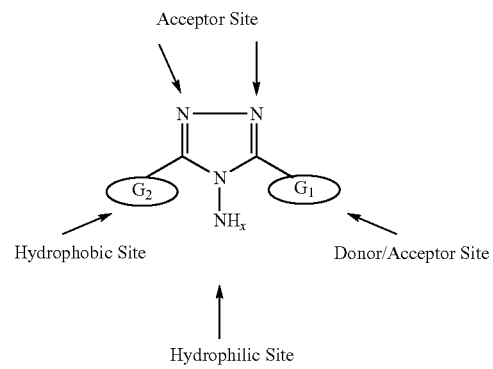

General formula (B)

where x is 1 or 2.

The groups included in the hydrophobic and donor/acceptor sites are described in more detail below with reference to the general formulas below. $G_2$ generally includes an aryl group, preferably $C_5$ or $C_6$ aryl group, optionally linked to an electron-withdrawing group positioned in the ortho, meta, or para positions of the aromatic group, or combination thereof. Aryl groups include phenyl, naphthyl, thienyl, indolyl as examples. The aryl group may include aromatic groups and may also include substituted aromatic groups, such as methyl benzene or dimethyl benzene, as examples.

By one approach, compounds effective to modulate susceptibility to environmental stress in plants include those represented by the formulae (1), (2), (3), (4), (5), (6) and (7) below.

In one aspect, a compound useful herein has formula (1):

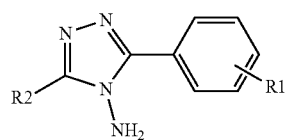

(1)

or an agriculturally acceptable salt thereof,
wherein
$R_1$ is halogen; OH; lower alkyl comprising $C_1$ to $C_{10}$ alkyl, preferably a $C_1$ to $C_6$ alkyl; lower halo-alkyl comprising $C_1$ to $C_{10}$ halo-alkyl; lower alkoxy comprising $C_1$ to $C_{10}$ alkoxy, preferably a $C_1$ to $C_6$ alkoxy, more preferably methoxy; or lower halo-alkoxy, and $R_2$ is a lower alkyl comprising $C_1$ to $C_{10}$ alkyl, preferably a $C_1$ to $C_6$ alkyl; lower halo-alkyl comprising $C_1$ to $C_{10}$ halo-alkyl, preferably a $C_1$ to $C_6$ halo-alkyl, more preferably a halo-alkyl comprising —$CF_3$, —$C_2F_5$, or —$C_3F_7$; —SH; or —$N(R_7)_x$,
wherein
x is 1 or 2 and
$R_7$ is N, —OH, lower alkyl, lower halo-alkyl, lower alkoxy, lower halo-alkoxy; an aromatic group; —$SCH_2CONR_8$; —$SCH_2COOR_8$; or —$SCH_2COR_8$,
wherein
$R_8$ is —H, lower alkyl, or lower halo-alkyl.

In one aspect, a compound useful for modulating susceptibility to environmental stress has formula (2):

$$\tag{2}$$

or an agriculturally acceptable salt thereof,
wherein
$R_1$ is a halogen; OH; lower alkyl comprising $C_1$ to $C_{10}$ alkyl, preferably a $C_1$ to $C_6$ alkyl; lower halo-alkyl comprising $C_1$ to $C_{10}$ halo-alkyl; lower alkoxy comprising $C_1$ to $C_{10}$ alkoxy, preferably a $C_1$ to $C_6$ alkoxy, more preferably methoxy; or lower halo-alkoxy;
$R_2$ is a lower alkyl comprising $C_1$ to $C_{10}$ alkyl, preferably a $C_1$ to $C_6$ alkyl; lower halo-alkyl comprising $C_1$ to $C_{10}$ halo-alkyl, preferably a $C_1$ to $C_6$ halo-alkyl, more preferably a halo-alkyl comprising —$CF_3$, —$C_2F_5$, or —$C_3F_7$; —SH; or —$N(R_7)_x$,
wherein
x is 1 or 2;
$R_6$ is lower alkyl or —$CF_3$.
$R_7$ is N, —OH, lower alkyl, lower halo-alkyl, lower alkoxy, lower halo-alkoxy; an aromatic group; —$SCH_2CONR_8$; —$SCH_2COOR_8$; or —$SCH_2COR_8$; and
$R_8$ is —H, lower alkyl, or lower halo-alkyl.

In one particular aspect of formula (2), R1 is a halogen, preferably Br, Cl, I, At, or F as shown below in formula (3):

$$\tag{3}$$

where $R_2$ and $R_6$ are as defined above in formula (2).

In another particular aspect of formula (2), the compound has the following formula:

where $R_2$ and $R_6$ are as defined above in formula (2).

In another particular aspect of formula (2), the compound has the following formula:

or an agriculturally acceptable salt thereof.

In one aspect, a compound useful for modulating susceptibility to environmental stress has formula (4):

$$\tag{4}$$

or an agriculturally acceptable salt thereof,
wherein $R_1$ is halogen; OH; lower alkyl comprising $C_1$ to $C_{10}$ alkyl, preferably a $C_1$ to $C_6$ alkyl; lower alkoxy comprising $C_1$ to $C_{10}$ alkoxy, preferably a $C_1$ to $C_6$ alkoxy, more preferably methoxy; or lower halo-alkoxy.

In one aspect, a compound useful for modulating susceptibility to environmental stress has formula (5):

$$\tag{5}$$

or an agriculturally acceptable salt thereof,
wherein $R_1$ is halogen; OH; lower alkyl comprising $C_1$ to $C_{10}$ alkyl, preferably a $C_1$ to $C_6$ alkyl; lower alkoxy comprising $C_1$ to $C_{10}$ alkoxy, preferably a $C_1$ to $C_6$ alkoxy, more preferably methoxy; or lower halo-alkoxy.

In yet another aspect, a compound useful for modulating susceptibility to environmental stress useful herein has formula (6):

$$\tag{6}$$

or an agriculturally acceptable salt thereof,
wherein $R_1$ is a halogen, lower alkyl, or lower alkoxy.

In a more particular aspect in formula (6), $R_1$ is fluorine. For example, such a compound is represented by formula (7) below and is referred to herein as "SD-29":

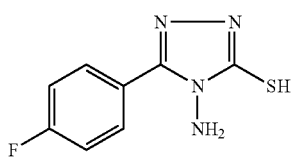

(7)

or an agriculturally acceptable salt thereof. The compound of formula (7) is described herein as "SD-29." In formula (7), another halogen, such as Br or $C_1$, can be used instead of F.

Agriculturally acceptable salts include any other salt form that retains the desired activity of the parent compound. For example, the agriculturally acceptable salt may include a triethylamine salt form, a triisopropanolamine salt form, a triethanolamine salt form and combinations thereof. Similarly, the agriculturally acceptable salt can include, for example, a potassium salt, a sodium salt, a lithium salt, and combinations thereof.

For the formulas described herein, $R_1$ may be halogen, such as fluorine (F), chlorine (Cl), bromine (Br), iodine (I), and astatine (At) (preferably fluorine (F), chlorine (Cl), bromine (Br); most preferably fluorine (F) or chlorine (Cl)); —OH; lower alkyl which comprises $C_1$ to $C_{10}$ alkyl (preferably a $C_1$ to $C_6$ alkyl (preferably methyl)); or lower alkoxy which comprises $C_1$ to $C_{10}$ alkoxy (preferably a $C_1$ to $C_6$ alkoxy, more preferably methoxy). $R_1$ can be positioned in the ortho, meta, or para positions of the aromatic ring. In principle, the aromatic ring may be substituted by one or more $R_1$ moieties.

As used herein, $C_1$ to $C_{10}$ alkyl includes linear, branched and cycloalkyl, including methyl, ethyl propyl isopropyl, butyl, iso-butyl, t-butyl, pentyl, neo-pentyl, cyclopentyl, hexyl, and cyclo hexyl, heptyl octyl, nonyl, and decyl, as examples.

As used herein, $C_1$ to $C_{10}$ halo-alkyl includes $C_1$ to $C_{10}$ alkyl having bromo, chloro, fluoro and/or iodo substitution. For example, a $C_1$ to $C_{10}$ halo alkyl may include branched halo-alkyl, such as —$CF(CF_3)_2$ by way of example.

As used herein, $C_1$ to $C_{10}$ alkoxy includes methoxy, ethoxy, propoxy, butoxy, pentoxy, and nonoxy, by way of example. The group may also be halo-alkoxy.

As used herein, $C_5$ or $C_6$ aromatic group includes cyclopentadienyl and phenyl, as examples, and may optionally be substituted. In the above formulas, the substituent(s) on an aromatic ring can also include moieties to enhance hydrophilicity of the compound. Suitable substituents include amides, esters, hydroxyl functional substituent and carboxylic acid (or carboxylates) as examples.

For instance, "lower" includes a substituent including a $C_1$-$C_{10}$ moiety, in another aspect a $C_1$-$C_6$ moiety.

In one aspect, $R_7$ is lower alkyl comprising $C_1$ to $C_{10}$ alkyl (preferably a $C_1$ to $C_6$ alkyl), lower halo-alkyl comprising $C_1$ to $C_{10}$ halo-alkyl (preferably a $C_1$ to $C_6$ halo-alkyl), lower alkoxy comprising $C_1$ to $C_{10}$ alkoxy (preferably a $C_1$ to $C_6$ alkoxy), lower halo-alkoxy which comprises $C_1$ to $C_{10}$ halo-alkoxy (preferably a $C_1$ to $C_6$ halo-alkoxy, more preferably —$CF_3$, —$C_2F_5$, —$C_3F_7$); —$CH_2R_8$, —$NCOR_8$, —$SCH_2COR_8$, —$SCH_2CONR_8$, wherein $R_8$ is a lower alkyl, such as $C_1$ to $C_{10}$ alkyl (preferably a $C_1$ to $C_6$ alkyl), lower halo-alkyl comprising $C_1$ to $C_{10}$ halo-alkyl (preferably a $C_1$ to $C_6$ halo-alkyl, more preferably a halo-alkyl comprising —$CF_3$, —$C_2F_5$, —$C_3F_7$), and an aromatic group (preferably $C_5$ or $C_6$ aromatic group).

Lower alkoxy includes $C_1$ to $C_{10}$ alkoxy (preferably a $C_1$ to $C_6$ alkoxy), by way of example, methoxy, ethoxy, n-propyloxy, isopropyloxy, isobutoxy, sec-butoxy, and tert-butoxy and the like.

Further compounds are provided in Table 1 below which are effective to modify susceptibility to environmental stress.

| Structure | Name |
|---|---|
| | SD-29-1 |
| | SD-29-2 |
| | SD-29-3 |
| | SD-29-4 |

-continued

| Structure | Name |
|---|---|
| (structure) | SD-29-5 |
| (structure) | SD-29-6 |
| (structure) | SD-29-7 |
| (structure) | SD-29-8 |
| (structure) | SD-29-9 |
| (structure) | SD-29-10 |
| (structure) | SD-29-11 |
| (structure) | SD-29-12 |

-continued

| Structure | Name |
|---|---|
| 5-methyl-indole with CH(OH)CF3 at position 3 | SD-34 |
| 5-methoxy-tryptophan (H3CO-indole with CH2CH(NH2)COOH) | SD-125 |
| indole with C(OEt)(=O)-O-CF3 substituent at position 3 | sd-rack-75 |
| 1,2-dimethyl-indole with C(=O)CF3 at position 3 | sd-rack-22 |
| 5-methyl-indole with CH(OH)CF3 at position 3 | sd-rack-34 |
| 5-methoxy-indole with CH2CH2OH at position 3 | sd-rack-48 | or an agriculturally acceptable salt thereof.

Methods

In one aspect, a method is provided for increasing or inducing stress resistance in crop plants or seeds, the method comprising applying one of more compounds described herein to the plant material or area of cultivation. The one or more compounds are applied in an amount effective to inducing resistance to an environmental stress. The one or more compounds are typically applied to the foliage of the plant but may also be applied to seeds or an area of cultivation. In accordance with this approach, a method is provided for increasing resistance to environmental and/or climate-associated stress in a plant, the method comprising applying to the plant an effective amount of a compound effective to increase $Tyr^{248}$ phosphorylation of RACK1A in response to an environmental stress. In a particular aspect, the compound is at least one of SD-29-1, SD-29-2, SD-29-3, SD-29-4, SD-29-5, SD-29-9, SD-29-11, SD-29-12, sd-rack-75, sd-rack22, sd-rack-34, sd-rack-48, sd-rack-125, or agriculturally acceptable salt thereof. Exemplary plants treatable by the compounds described herein include, for example, a variety of crop plants. In one particular aspect, when SD-29-

12 is used, the environmental stress is a stress other than salt because SD-29-12 was shown to increase susceptibility to salt stress.

In other approaches, compounds are provided that are effective to increase or artificially induce susceptibility to environmental and/or climate associated stress in a plant. These compounds may be advantageously used as a herbicide, particularly to induce environmental stresses in unwanted plants such as weeds. In accordance with this approach, a method is provided for inducing susceptibility to environmental and/or climate-associated stress in a plant, the method comprising applying to the plant an effective amount of a compound effective to increase Tyr$^{248}$ phosphorylation of RACK1A in response to an environmental stress. In this respect, one or more of the compounds having herbicidal effect may be applied in an herbicidally effective amount, which is the amount needed to reduce the rate of growth of a plant, or even cause the plant to die, when administered to the plant at a given application. In one aspect, the application of the compound results in plant death, such as within about one to two weeks.

Compounds that are particularly useful for inducing environmental stress in a plant include SD-29-6, SD-29-7, SD-29-8, SD-29-10, and SD-29-12. In one particular aspect, when SD-29-12 is used, the environmental stress is salt because SD-29-12 was not shown to induce susceptibility to heat stress.

In one approach, a liquid agricultural composition is provided comprising: (i) any compound described herein, being present in a concentration that is biologically effective when the composition is diluted in a suitable volume of water and/or other liquid, and applied to a susceptible plant, particularly the foliage of the plant, or cultivation area. For example, instead of water, another liquid, such as DMSO or other suitable medium can be used in formulating an agricultural composition or a concentrate. In principle, other suitable media can be used that include an alkanol (methanol or ethanol) as an example. The liquid agricultural composition may be provided in concentrated or ready-to-use form. By one approach, the concentrated form should be diluted, such as in water, for application to the plant.

The amount of the one or more compounds administered can be varied according to, for example, the type of plant, application time, soil conditions, formulation concentration, and the like. The method of application can include aerosol spray or other methods, such as adapting techniques used for applying fertilizers.

Methods

In another aspect, compounds in accordance with can be synthesized as shown in the following exemplary reaction scheme:

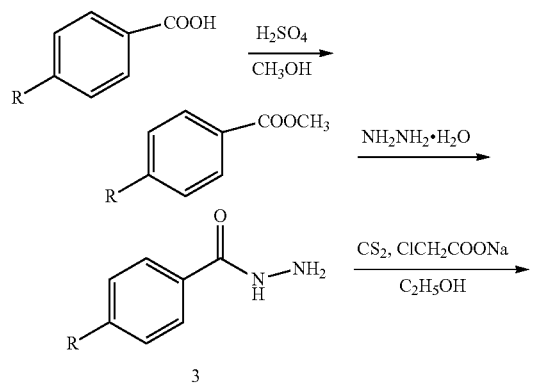

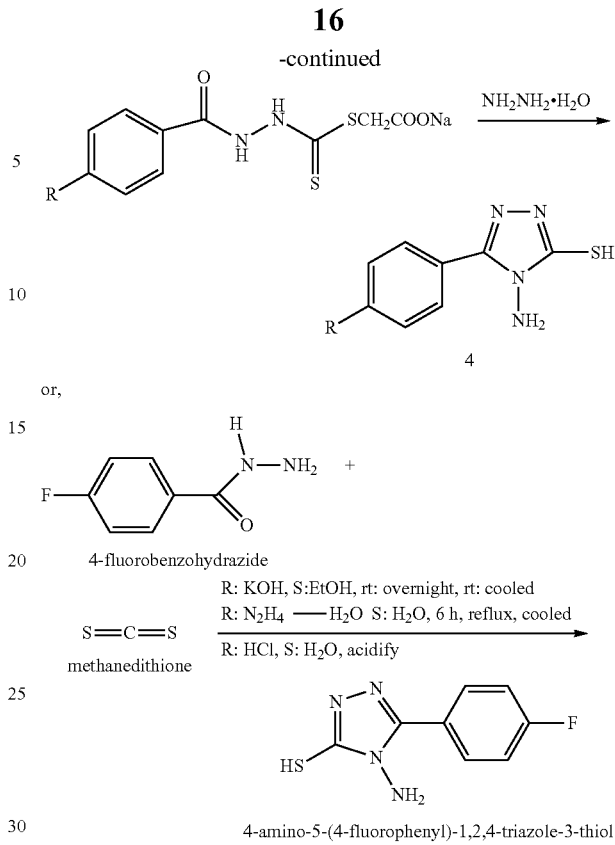

4-fluorobenzohydrazide methanedithione

R: KOH, S:EtOH, rt: overnight, rt: cooled
R: N$_2$H$_4$ —— H$_2$O S: H$_2$O, 6 h, reflux, cooled
R: HCl, S: H$_2$O, acidify 4-amino-5-(4-fluorophenyl)-1,2,4-triazole-3-thiol Alternatively, a compound wherein R$_1$ is fluoro and R$_2$ is SH can be synthesized as follows. The hydrazide (0.04 mol) and KOH (0.04 mol) in 50 cm$^3$ MeOH were treated with CS$_2$ (0.04 mol), and the mixture was stirred for 16 h at room temperature. Diethyl ether (50 cm$^3$) was added, and the precipitated solid was filtered, washed with ether, and vacuum-dried at 78° C. in a drying pestle. The potassium salts of substituted dithiocarbazinic acids were used for the next step without further purification. The potassium salt of the substituted dithiocarbazinic acid (0.02 mol) and hydrazine hydrate (0.04 mol) in 2.0 cm$^3$ water were heated under reflux with stirring for 0.5-1.5 h. The color of the reaction mixture changed to green with the evolution of hydrogen sulfide, and a homogeneous solution was formed in half an hour. When evolution of hydrogen sulfide ceased (lead acetate test), the reaction mixture was diluted with 50 cm$^3$ cold water and acidified with 6 N hydrochloric acid. The precipitated solid was filtered, washed with cold water, and recrystallized from aqueous EtOH. 4-amino-5-(3-fluorophenyl)-2,4-dihydro-3H-1,2,4-triazole-3-thione (5e, C$_8$H$_7$FN$_4$S) Yield 72%; m.p.: 220° C.; 1H NMR ((CD3)2CO, 300 MHz): d=5.53 (s, 2H, NH2), 7.34 (m, 1H, Ar—H), 7.79 (m, 1H, Ar—H), 8.01-8.04 (m, 2H, Ar—H), 12.94 (s, 1H, NH) ppm; 13C NMR ((CD3)2CO, 75 MHz): d=114.7 (d, JC, F=24.7 Hz, C2-arom.), 117.2 (d, JC, F=21.0 Hz, C4-arom.), 124.0 (d JC, F=3.0 Hz, C6-arom.), 128.2 (d, JC, F=9.0 Hz, C5-arom.), 130.6 (d, JC, F=8.3 Hz, C1-arom.), 148.4 (C-5), 162.4 (d, JC, F=242.3 Hz, C3-arom.), 168.6 (C-3) ppm; IR (KBr): v1/43, 288; 3; 171; 1; 536; 1; 315; 1; 192 cmŷ; MS (El): m/z (%)=210 (M, 100), 195 (2), 139 (25), 122 (34), 95 (23), 75 (8), 60 (12).

Compounds can also be synthesized by adapting procedures described in J. Medicinal Chemistry, 52(14), 4200-4209 (2009); Condensed heterocyclic systems containing bridgehead nitrogen atom: synthesis and antimicrobial activity of s-triazolo[3, 4-b][1, 3, 4] thiadiazines, thiazolo[3, 2-b]-s-triazoles and isomeric thiazolo[2, 3-c]-s-triazoles. Indian Journal of Chemistry, Section B: Organic Chemistry Including Medicinal Chemistry (2002), 41B, (2), 403-406; and A novel 5-mercapto triazole Schiff base as a selective chromogenic chemosensor for Cu$^{2+}$, Liu, Ming-Xia et al., Spectrochimica Acta, Part A: Molecular and Biomolecular Spectroscopy, 79(5), 1837-1842; 2011. Producing compounds wherein the "R" type substituent on the phenyl group represents another group besides halogen (fluorine in the example), or other positional isomers, can be prepared by adapting the disclosed synthesis routes. SCH$_2$COOH, amide, =S and =O are alternatives to —SH. Amide includes, by way of example, —N(CH$_3$)$_2$. Besides fluorine, halogen includes chlorine and bromine, although other electronegative groups, such as fluoromethoxy, difluoromethoxy, trifuoromethoxy and trifluoromethyl as examples, can substitute for a halogen.

In another aspect, compounds in accordance with the disclosure can be synthesized as shown in the following exemplary reaction scheme.

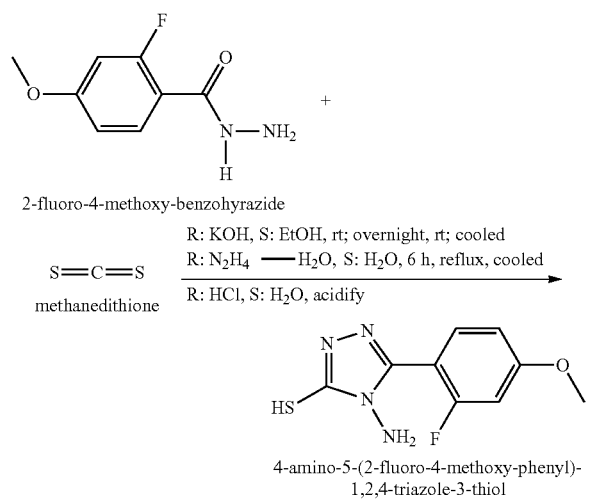

It will be appreciated compounds having different substituent(s) instead of the exemplified compound having a para-methoxy substitutent or the ortho-fluorine substitution on the phenyl ring can be synthesized by adapting an appropriate synthesis, including those described in J. Medicinal Chemistry, 52(14), 4200-4209 (2009); Condensed heterocyclic systems containing bridgehead nitrogen atom: synthesis and antimicrobial activity of s-triazolo[3, 4-b][1, 3, 4] thiadiazines, thiazolo[3, 2-b]-s-triazoles and isomeric thiazolo[2, 3-c]-s-triazoles, Indian Journal of Chemistry, Section B: Organic Chemistry Including Medicinal Chemistry (2002), 41B, (2), 403-406; and 3. A novel 5-mercapto triazole Schiff base as a selective chromogenic chemosensor for Cu2+, Liu, Ming-Xia et al., Spectrochimica Acta, Part A: Molecular and Biomolecular Spectroscopy, 79(5), 1837-1842; 2011, the complete disclosures of which are incorporated herein by reference. Thus, producing compounds wherein the "R" type substituent on the phenyl ring represents aryl or another group can be prepared. In addition to the exemplified fluorine substitution, other halogen substitution is contemplated, such as bromine and chlorine, as are other electronegative groups, such as fluoromethoxy, difluoromethoxy, trifuoromethoxy and trifluoromethyl as examples. SCH$_2$COOH, amide, =S and =O are alternatives to —SH. Amide includes, by way of example, —N(CH$_3$)$_2$.

Analogs of the compound according to formula (4) can be synthesized as shown in the following exemplary reaction scheme:

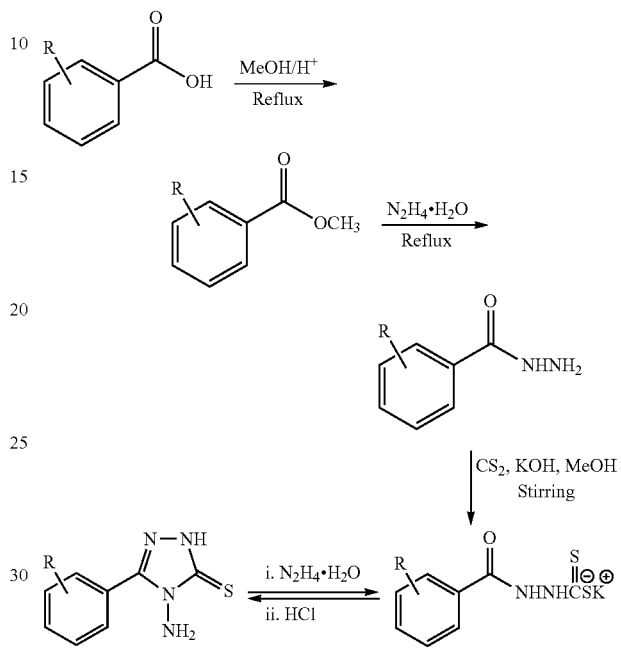

Analogs include those where, besides fluorine substitution for R, other halogen substitutions are contemplated, such as bromine and chlorine, as well as electronegative groups, such as fluoromethoxy, difluoromethoxy, trifluoromethoxy and trifluoromethyl as examples.

Advantages and embodiments of the compositions and methods described herein are further illustrated by the following examples; however, the particular conditions, processing steps, materials, and amounts thereof recited in these examples, as well as other conditions and details, should not be construed to unduly limit the described methods and compositions. All percentages are by weight unless otherwise indicated.

EXAMPLES

In the examples described herein, the test compounds (e.g., SD-29 or analogs thereof) were dissolved in dimethyl sulfoxide (DMSO) to provide a 20 mM concentration. Micromolar concentrations were then prepared as needed by addition to the water incubation media. Unless stated otherwise, the experimental plants were incubated with the roots immersed in the water containing the compound. The control plants received only DMSO in the same amount as that of the compound.

Example 1

*Arabidopsis* is a member of the mustard (Brassicaceae) family, which includes cultivated species such as cabbage and radish. *Arabidopsis* offers important advantages for basic research in genetics and molecular biology, such as: (1) approximately 115 Mb of the 125 Mb genome has been sequenced and annotated (Nature, 408:796-815; 2000); and, for example, (2) a short life cycle—about 6 weeks from germination to seed maturation. Seed production is prolific and the plant is easily cultivated in restricted space. *Arabidopsis thaliana* has been studied in the research community (academia, government and industry).

A crystal structure of *Arabidopsis thaliana* RACK1 protein has been reported. Deducing the crystal structure of the *Arabidopsis* RACK1A protein highlighted the potential functional residues of the protein. Noteworthy in the structure was the functionally conserved tyrosine phosphorylation residue (Y248) that has been implicated in RACK1A function. Therefore, it was undertaken to identify a chemical inhibitor of Y248 phosphorylation that would serve as a potential "anti-stress" compound in countering environmental stresses in plants. In order to identify small compounds occupying the Y248 pocket, docking simulations with a subset of 30,000 compounds were performed. Based on ranking with an energy cut-off of 25 kcal/mol, 3,011 compounds were then selected. Upon further re-ranking, 46 lead compounds were identified and 11 compounds were screened for their efficacy in an in-vitro assay. Six compounds were found to prevent tyrosine phosphorylation (Y248) based homodimerization of RACK1A proteins. Those six compounds include SD-29, SD-29-9, SD-29-11, SD-29-22, SD-34, and SD-125.

The most active compound (SD-29) with an $IC_{50}$ value of 12.5 µM (data not shown) was used in several key biological experiments. FIG. 1 shows the docked model of RACK1A with SD-29 at the Y248 phosphorylation pocket. The right panel shows the detailed view of the SD-29 (carbon green) interaction with RACK1A binding site indicating that SD29 potentially hydrogen bonds with Ser244 and Trp249 and maintains hydrophobic interactions with Try248, Phe204, Leu263, and Trp249 residues.

The effect of SD-29 on modulating the effect of heat stress (37° C. and 42° C.) on *Arabidopsis* plants was evaluated. *Arabidopsis thaliana* is a small flowering plant that is widely used as a model in plant biology. *Arabidopsis* is well suited for light microscopy analysis. Young seedlings on the whole and their roots in particular, are relatively translucent. This, together with their small size allows live cell imaging using fluorescence and confocal laser scanning microscopy.

Figure 2:
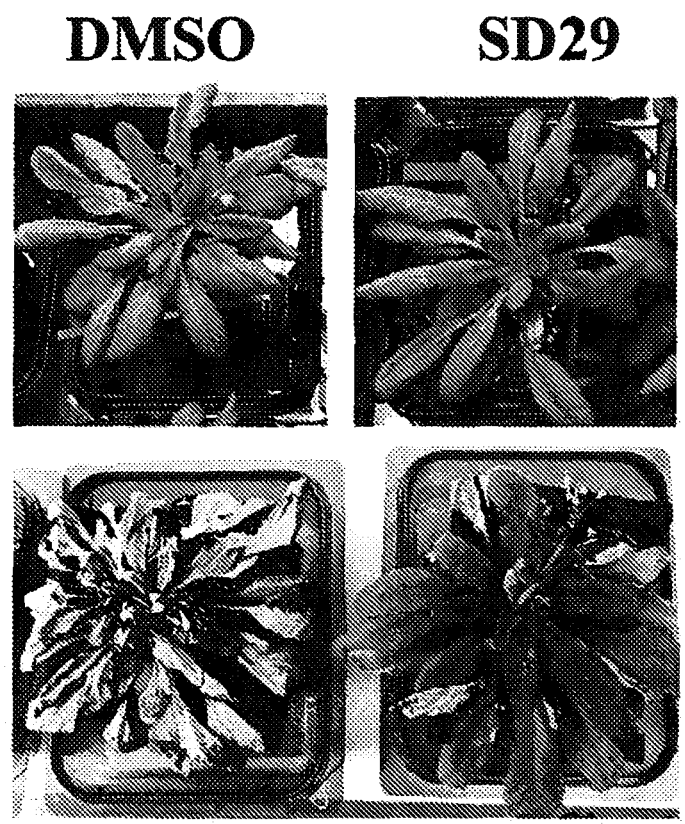
FIG. 2 includes photographs of plants showing that SD-29 induces resistance to salt stress.

In the first experiment, *Arabidopsis* plants were treated with 150 mM salt for two weeks. One plant in each group was treated with 100 µM SD-29 plus 150 mM salt and the other plant in each group was treated with DMSO plus 150 mM salt. The upper panel of FIG. 2 shows the plants at the beginning of the experiment and the lower planel shows the results after two weeks of growth at 22° C. under 8 hour of light/day inside a growth chamber. As seen in the figure, the SD-29 was effective to allow the *Arabidopsis* plants to withstand the salt stress induced chlorosis of the plants. The plants were treated with the indicated treatment twice during the experiment.

Figure 3:
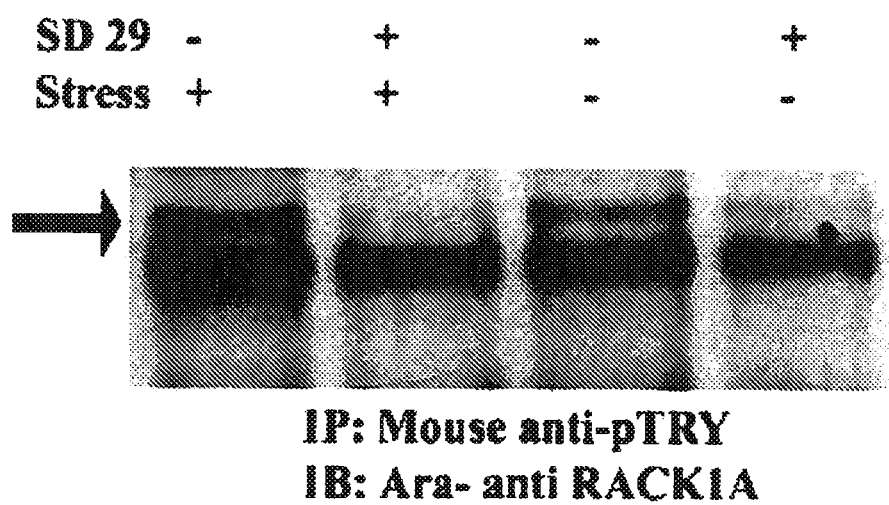
FIG. 3 includes a photograph of an SDS-PAGE gel showing that SD-29 prevents RACK1A Tyr$^{248}$ phosphorylation.

In the second group (FIG. 3), *Arabidopsis* plants were held at 42° C. for six hours and compared to control plants held at about 22° C. The *Arabidopsis* plant in the experimental group was treated with 60 µM SD-29 in water. A control plant received water and DMSO. Lysates were then prepared from the leaves and western blots were performed using immobilized mouse anti-pTRY and *Arabidopsis*-anti RACK1A. FIG. 3 shows that SD29 prevents *Arabidopsis* RACK1A tyrosine phosphorylation (indicated by the arrow) during heat stress conditions.

Figure 4:
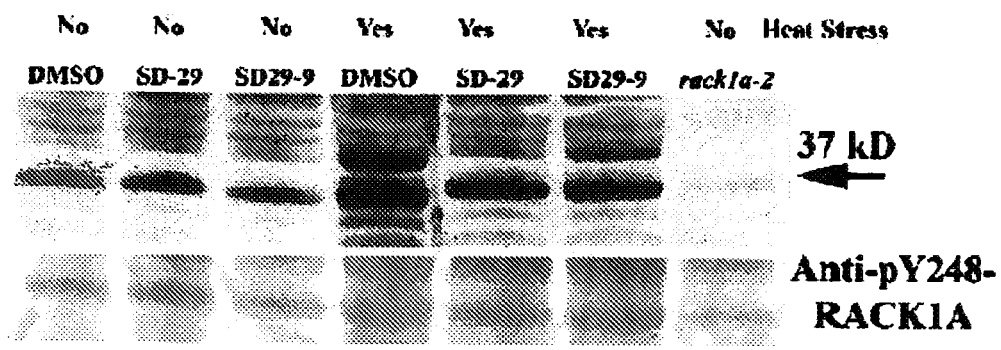
FIG. 4(A) includes a photograph of an SDS-PAGE gel showing that SD-29 and SD-29-9 prevents RACK1A Tyr$^{248}$ phosphorylation under heat stress and 4(B) includes photographs of plants showing that SD-29-12 induces resistance to heat stress.
Figure 4:
Figure 4:

A similar experiment was carried out using analog SD-29-9 and SD-29 at 42° C. for three hours. As shown in FIG. 4(A), SD-29-9 and SD-29 were found to be effective to prevent *Arabidopsis* RACK1A tyrosine phosphorylation at increased temperature. A western blot was then performed using an antibody that was raised targeting phosphorylated Y248 residue of RACK1A. In FIG. 4(B), interestingly, an analog of SD29, named as SD29-12 has been found to be very effective in preventing high temperature stress induced deformations in the *Arabidopsis* plants that is evident in the vehicle control (DMSO) treated plant at 42° C.

Example 2

Salt stress responses in rice, tomato, pepper, and bean plants were evaluated. As described in more detail below, the results indicate that the use of SD-29 (60 µM) can protect various plants from salt-induced growth arrest.

The effect of SD-29 on modulating salt-induced stress was evaluated with rice detached leaves at room temperature (about 24° C.) for seven days in a water incubation medium. All plants received sufficient incubation medium to last the seven days. Plant A (left most) received 250 mM NaCl plus DMSO, Plant B (right of Plant A) received 60 µM SD-29 and 250 mM NaCl, and plant D received 60 µM SD-29 in the incubation medium. The incubation medium of Plant C was untreated.

Figure 5:
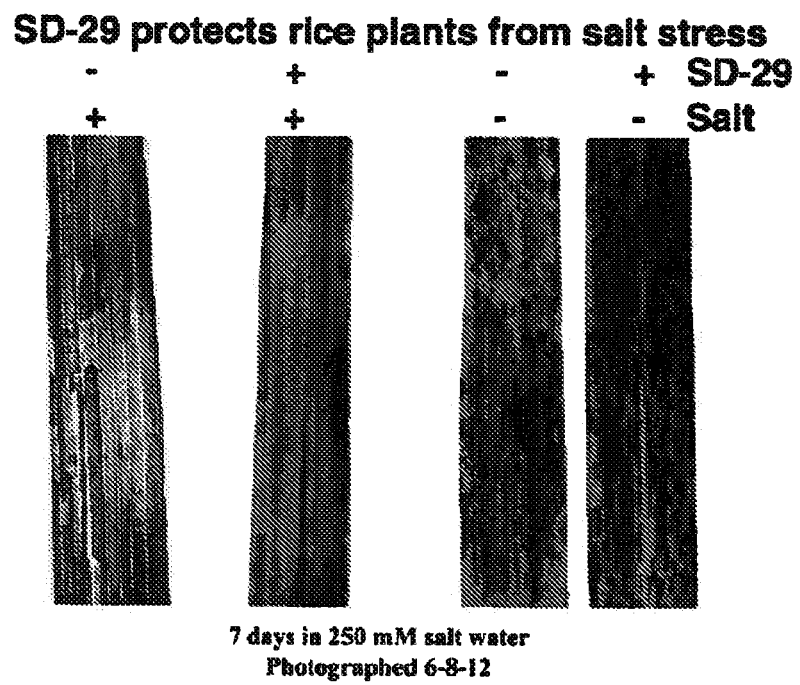
FIG. 5 includes photographs of rice leaves showing that SD-29 protects rice plants from salt-induced chlorosis.

The rice plant leaves were photographed directly after seven days. As shown in FIG. 5, SD-29 was found to protect the rice leaves from salt stress-induced chlorosis (degradation of chlorophyll pigments). Much of the chlorophyll of plant A (salt treatment alone) was degraded, while SD-29 treated leaves (Leaf B) maintained the chlorophyll level even in the presence of the same amount of salt. Leaf D (SD-29 treatment alone) showed little difference from control Leaf C.

Figure 6:
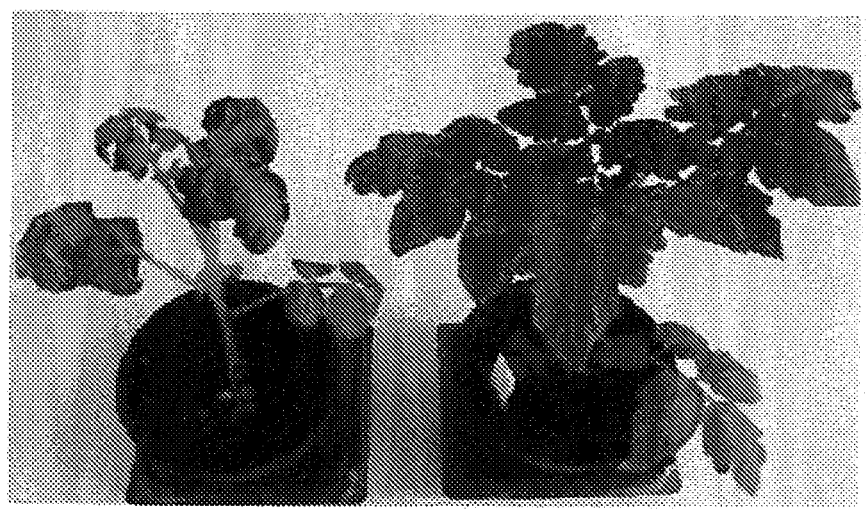
FIG. 6 includes photographs of tomato plants showing that SD-29 induces resistance to salt stress.

Salt-induced stress was evaluated with tomato plants at room temperature (about 24° C.) for five days. The plants received sufficient incubation media to last through the five day experiment. Plant A received 60 µM SD-29 plus 250 mM NaCl and plant B received 250 mM NaCl (plus DMSO in the same volume as the volume of SD-29 received by plant A) in the incubation medium. As shown in FIG. 6, the tomato plant treated with SD-29 thrived (did not wilt) in the high salt conditions while the tomato plant not treated with SD-29 did not.

Figure 7:
FIG. 7 includes photographs of bean plants showing that SD-29 induces resistance to salt stress.

Salt-induced stress was evaluated with bean plants at room temperature (about 24° C.) for 96 hours. All plants received sufficient incubation media to last the seven days. Plant A received 60 µM SD-29 plus 250 mM NaCl and plant B received 250 mM NaCl in the incubation medium. As shown in FIG. 7, the bean plant treated with SD-29 thrived (did not wilt) in the high salt conditions while the tomato plant not treated with SD-29 did not.

Figure 8:
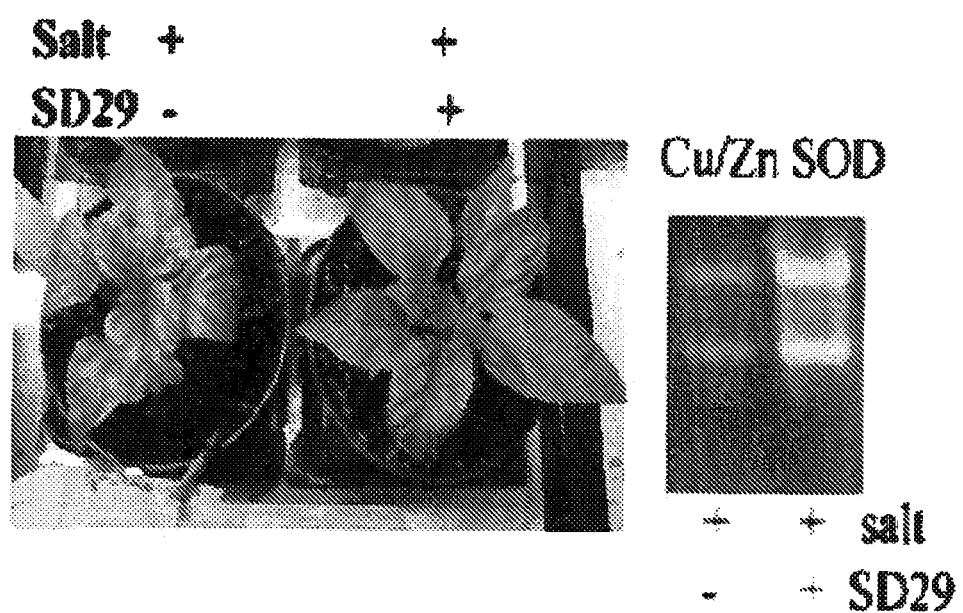
FIG. 8 includes photographs of pepper plants showing that SD-29 induces resistance to salt stress and a photograph of a gel showing SD-29 upregulates both the cytoplasmic (lower band) and chloroplastic (upper band) Cu/Zn SOD enzyme activities activity in pepper plants.

Salt-induced stress was evaluated with pepper plants at room temperature (about 24° C.) for 48 hours. All plants received sufficient incubation media to last the seven days. Plant A received 60 µM SD-29 plus 250 mM NaCl and plant B received 250 mM NaCl in the incubation medium with DMSO. As shown in FIG. 8, the pepper plant treated with SD-29 thrived in the high salt conditions (with no chlorosis) while the untreated plant was not protected from salt stress.

Native gel analysis was performed on a lysate prepared from the pepper plant leaves in FIG. 8. The gel is stained for detecting enzymatic activity of different isoforms of superoxide dismutase—key enzymes that detoxify the reactive oxygen species which usually develop during the stress conditions. As shown in FIG. 8, SD-29, compared to the DMSO treated plants, caused upregulation of both the cytoplasmic (lower band) and chloroplastic (upper band) Cu/Zn SOD enzyme activities in the salt tolerant pepper plants. Therefore, it appears that SD-29 may help detoxify the cellular reactive oxygen species generated during the salt stress conditions.

Figure 9:
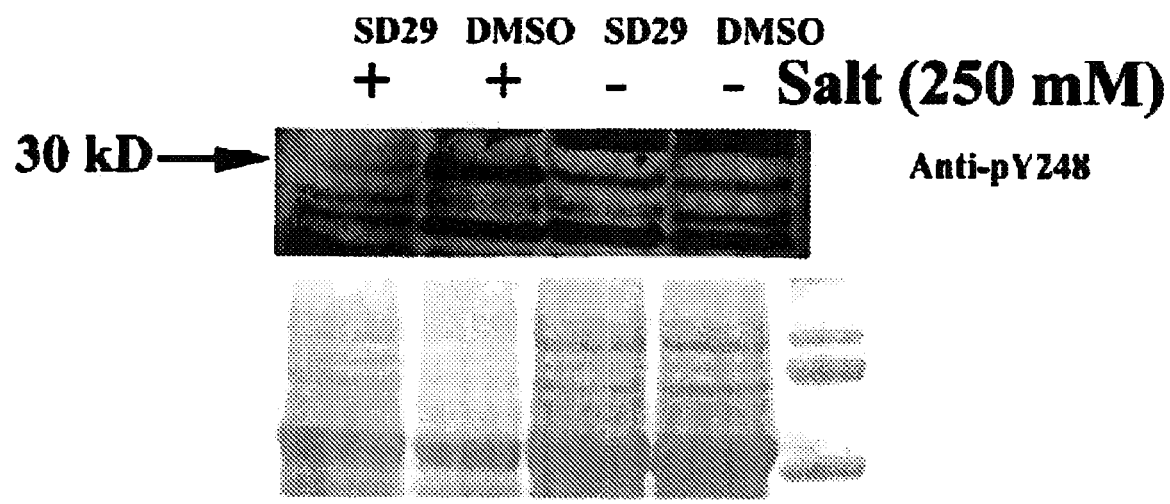
FIG. 9 includes a photograph of an SDS-PAGE gel showing that SD-29 prevents RACK1A Tyr$^{248}$ phosphorylation.

The rice leaves were also analyzed by Western blot. Lysates were prepared from the leaves and western blot analysis was carried out using standard methods. 75 μg protein were loaded per lane. The membrane containing transferred proteins were probed with anti-pY248, which is an antibody raised to specifically detect phosphorylated tyrosine at residue 248 of RACK1A. As shown in FIG. 9, the first lane (plant treated with salt and SD-29) shows that SD29 significantly inhibited rice RACK1A tyrosine phosphorylation under salt stress conditions. The lower panel of FIG. 9 shows the ponceau standing as loading control. It should be noted that lane 2 (+salt, +DMSO) has the lowest amount of protein loading yet the lane shows the highest level of Y248 phosphorylation.

Figure 10:
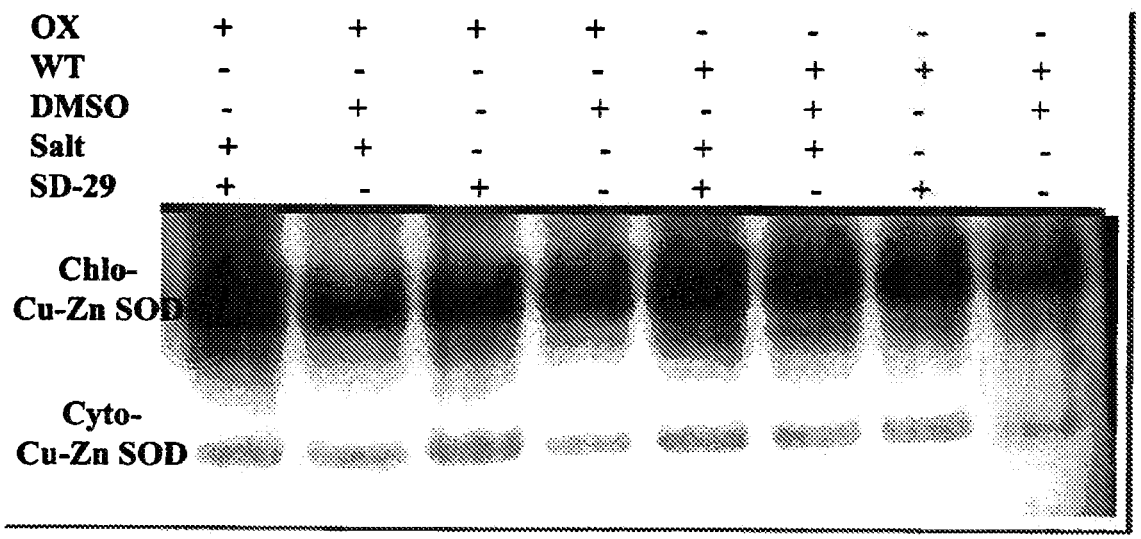
FIG. 10 includes a photograph of an SDS-PAGE gel showing that SD-29 upregulates chloroplastic Cu—Zn SOD activity in rice leaves.

The wild-type rice plants were compared to a rice plant over-expressing rice RACK1 protein (referred to as "OX"). The OX plants were treated as described in this example for the wild-type rice plant. Native gel assay was performed as described for FIG. 8 and the experimental set up was exactly the same as described for FIG. 5. As shown in FIG. 10, it was found that SD-29 upregulates chloroplastic Cu—Zn SOD activity in rice leaves. This suggests that SD-29 may play a role in photosynthetic reactive oxygen species (ROS) detoxification generated in the leaves during salt stresses.

Figure 11:
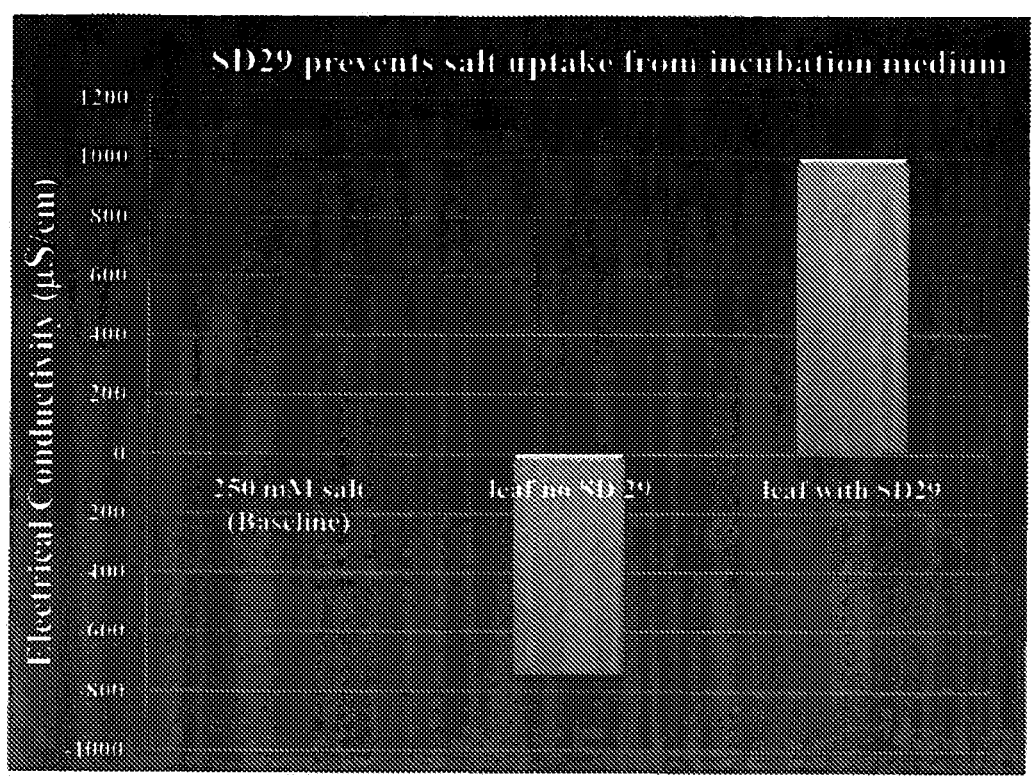
FIG. 11 includes a chart showing that SD-29 prevent salt uptake from the incubation medium.

To examine whether the salt stress resistance comes from the differential uptake of sodium ions due to the drug treatment, the uptake of salts from the incubation medium was assayed (leaves from FIG. 5). As seen in FIG. 11, more sodium ions remained in the incubation medium for the SD-29 treated rice leaves compared to the non-treated leaves. The base point is indicated with 250 mM of salt line.

Example 3

Figure 12:
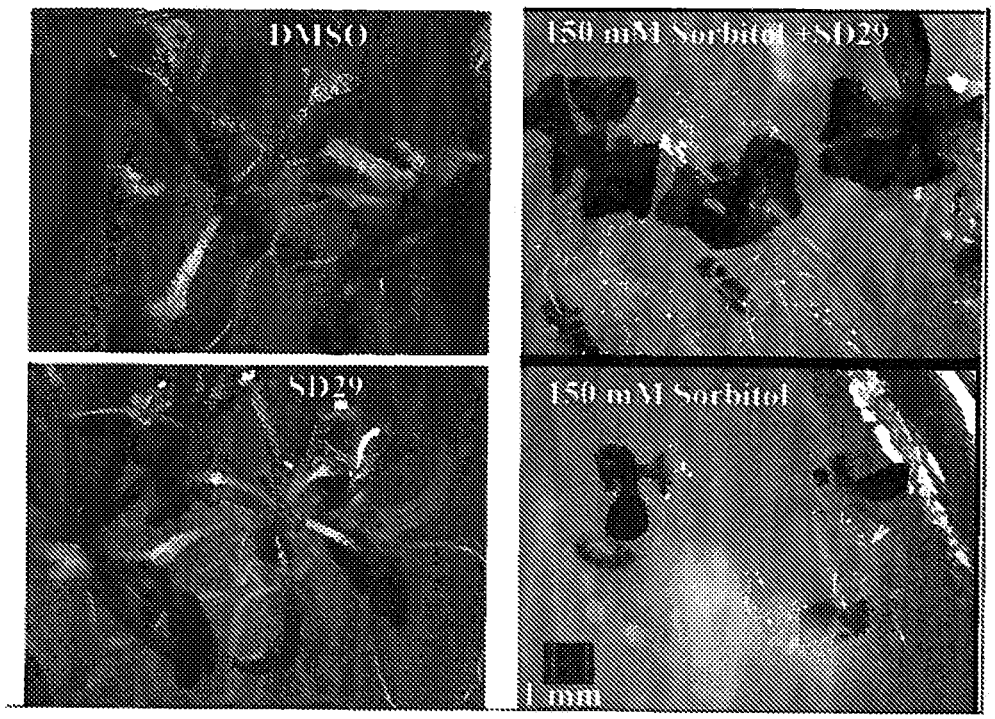
FIG. 12 includes photographs of plants showing that SD-29 induces resistance to drought conditions.

The effect of SD-29 on modulating drought-induced stress was evaluated with *Arabidopsis* plants for about three weeks at room temperature. Sorbitol was used to imitate drought conditions. All plants received sufficient incubation media to last the seven days. Plant A was treated with DMSO (in a volume equal to the volume of SD-29 used for Plants B and C), plant B was treated with 150 mM sorbitol plus 60 μM SD-29, plant C was treated with 60 μM SD-29, and plant D was treated with 150 mM sorbitol in the incubation medium. As can be seen in FIG. 12, the plant treated with SD-29 and sorbitol performed much better than the plant treated with sorbitol alone.

Example 4

Figure 13:
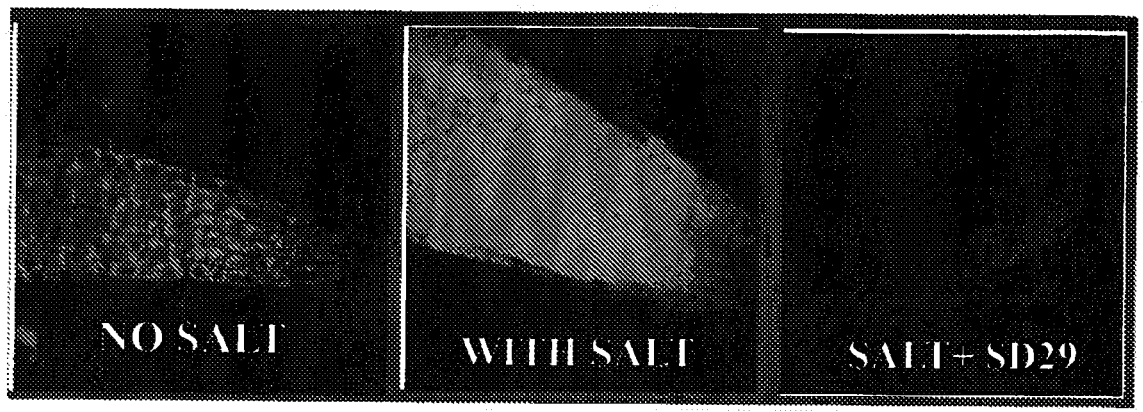
FIG. 13 includes photographs showing RACK1A:GFP expression is down regulated by SD-29.

*Arabidopsis* plants transformed with a RACK1A:GFP construct were analyzed to determine the effect of SD-29 on expression of RACK1A. The experimental plant was treated with 60 μM SD-29 with 250 mM salt for 6 hours. Controls were treated with and without salt. As shown in FIG. 13, treatment with SD-29 resulted in down regulation of RACK1A:GFP expression. Treatment with salt alone upregulated RACK1A:GFP expression. It is quite possible that downregulation of RACK1A expression by SD-29 may be the cellular mechanism that allow the plants to withstand salt stress.

Example 5

Figure 14:
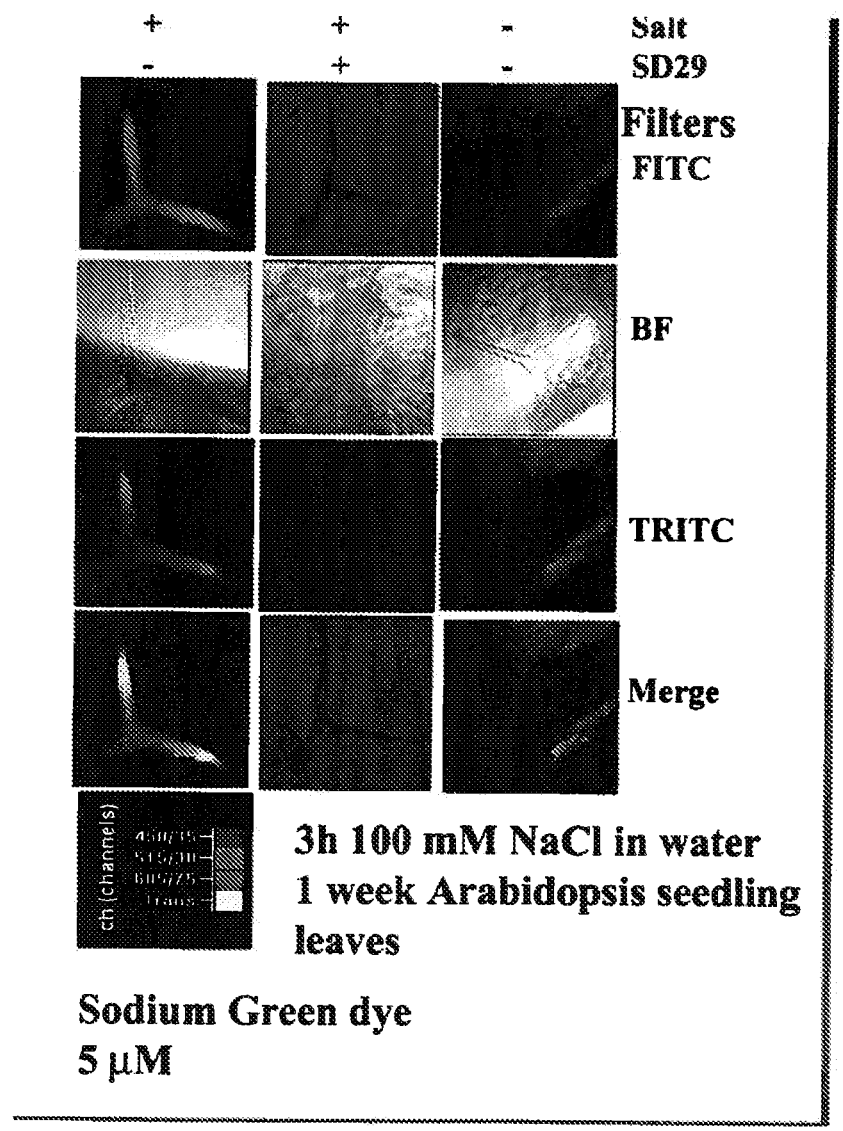
FIG. 14 includes fluorescent microscopy images showing that SD-29 prevents salt uptake through the salt glands on *Arabidopsis* leaves.

1 week old *Arabidopsis* plants were treated with and without 100 mM salt, as well as with and without the presence of 60 μM SD-29, in incubation medium for three hours. The leaves were stained with sodium green dye (5 μM) according to the manufacturer's protocol (Invitrogen, Calif.) and analyzed by fluorescent microscopy to determine if the plants take up sodium from the incubation medium. The dye fluoresces in the presence of sodium ion. As shown in FIG. 14, SD-29 prevents salt uptake through the salt glands (trichome) on the leaves (as less sodium ion in the gland, less fluorescence from the glands compared to the no SD-29 treated plants).

Example 6

Figure 15:
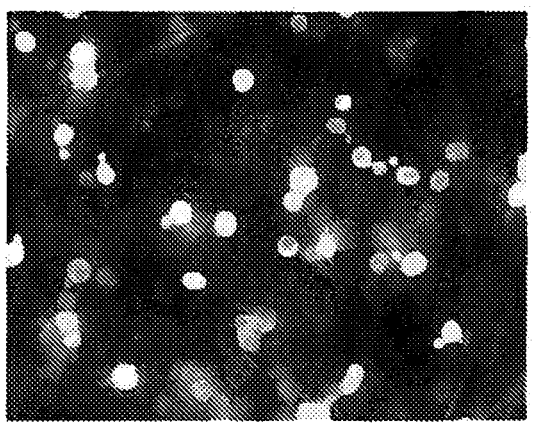
FIG. 15 includes fluorescent microscopy images showing that SD-9-9 and SD-9-11 were effective to protect homodimerized RACK1A maintaining yeast cells from UV-B induced cell death.
Figure 15:
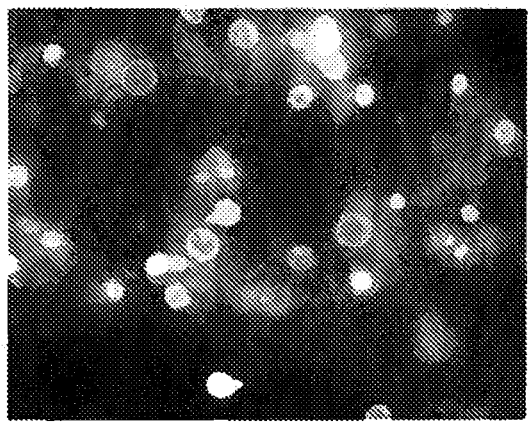
Figure 15:
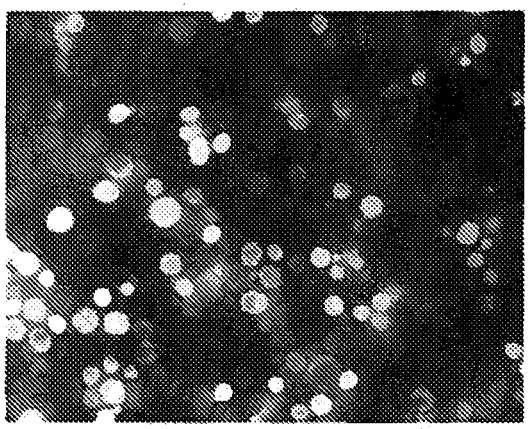
Figure 15:
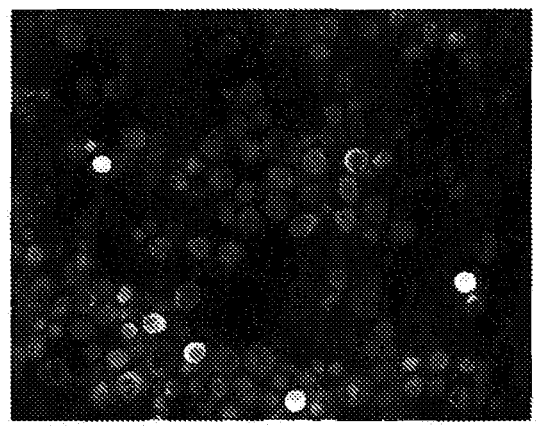

In this experiment, yeast cells were irradiated with UV-B light to analyze the effect of SD-29 analogs on UV-B induced cell death. The yeast cells were developed to assay for RACK1A homodimerization assays using split-ubiquitin technique. In this assay, homodimerized RACK1A maintaining yeast cells (AA) were grown overnight in the presence of 60 μM of the indicated compounds. Yeast cells treated overnight with SD-29-7, SD-29-9, and SD-29-11 with and without exposure to UV-B were compared to a DMSO-only control. The cells were stained with Invitrogen's Live/dead cell assay system where dead cells appeared as intensely fluorescent with brightness under a fluorescent microscope. As can be seen in FIG. 15, SD-9-9 and SD-9-11 were effective to protect yeast cells from UV-B induced cell death. On the other hand, analog SD29-7 did not protect the cells.

Example 7

In this experiment, yeast was treated with UV-B to analyze the effect of SD-29-12 on UV-B induced cell death. Two groups of yeast were used. One was the yeast used in Example 6 ("AA") and the other ("YY") is a Y248F mutant. The AA cells can homodimerize but YY cells cannot.

Figure 16:
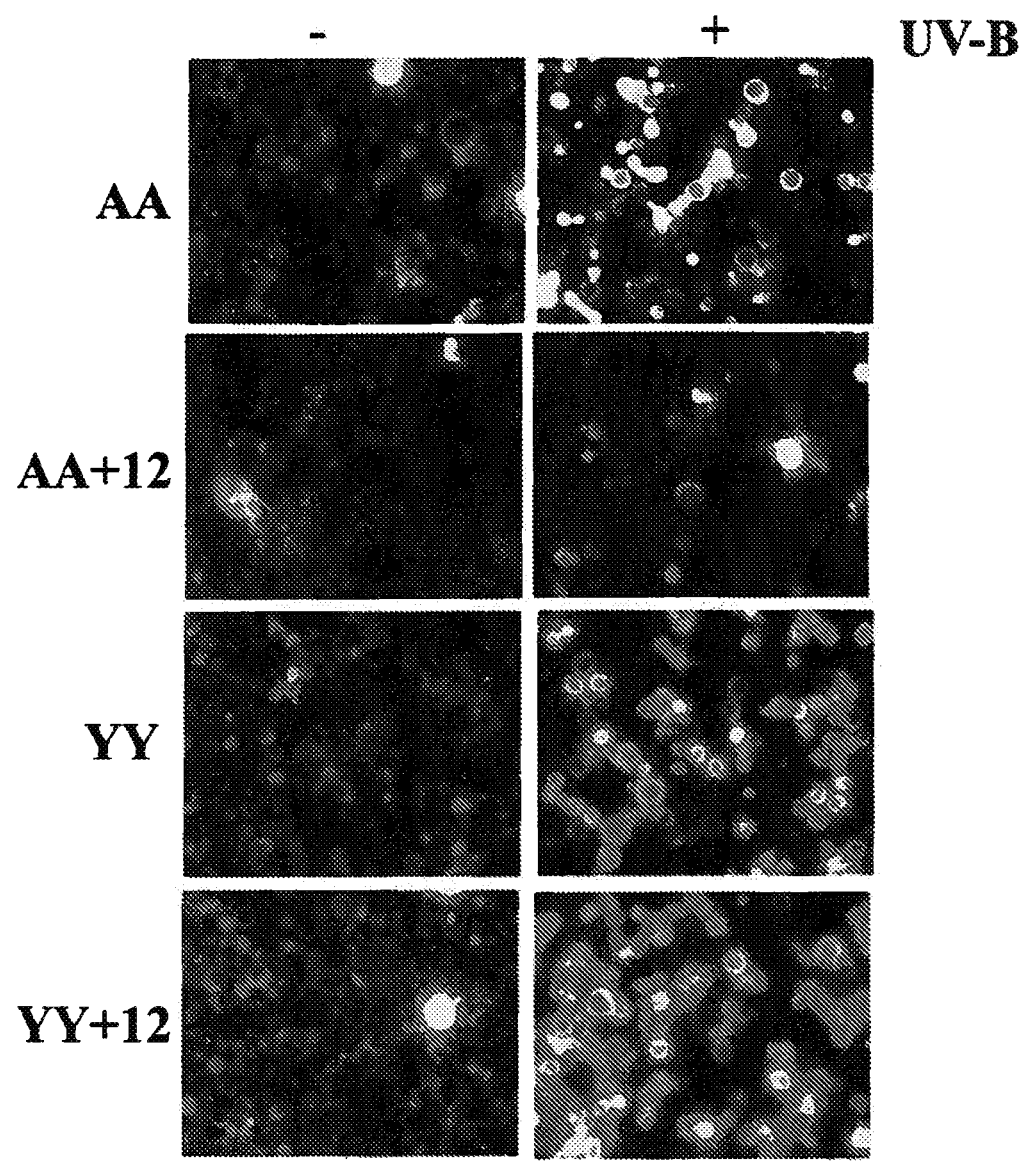
FIG. 16 includes fluorescent microscopy images showing that SD-29-12 was effective to prevent UV-B induced cell death in homodimerized RACK1A maintaining yeast cells.

The yeast was treated overnight with SD-29-12 and then followed the same protocol as described in Example 6. As can be seen in FIG. 16, SD-29-12 was effective to prevent UV-B induced cell death in yeast "AA." But mutation of the drug target (Y248 residue) failed to provide protection from UV-B induced cell death.

Example 8

Figure 17:
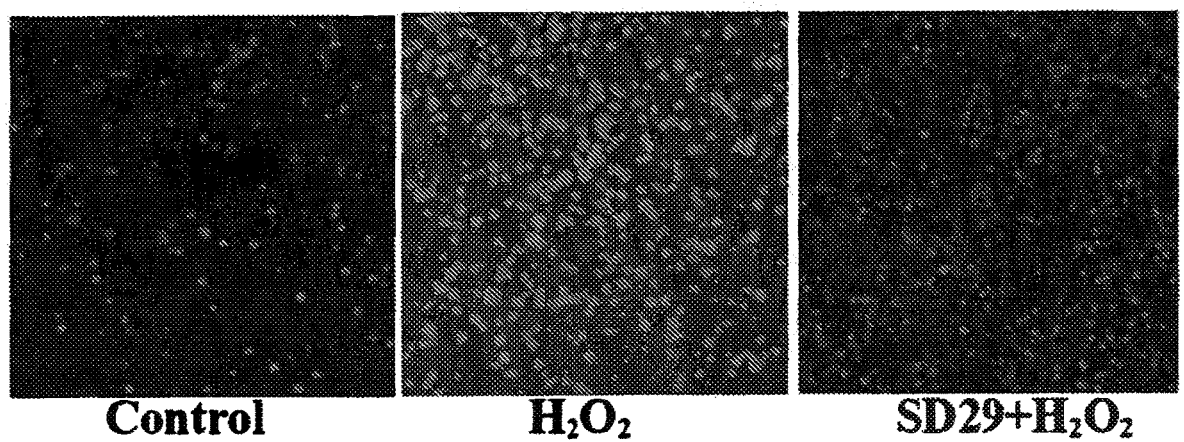
FIG. 17 includes fluorescent microscopy images showing that SD-29 treated protoplasts did not accumulate $H_2O_2$-induced reactive oxygen species.

In this example, to examine whether SD-29 can prevent generation of reactive oxygen species (ROS) under stress, the effect of SD-29 on $H_2O_2$ treated *Arabidopsis* protoplasts was evaluated. Protoplasts were treated with $H_2O_2$ for 2 hours with and without 60 μM SD-29. An untreated control was also evaluated. The protoplasts were stained with reactive oxygen species visualization dye H2DCF that fluoresces in the presence of ROS and the treated protoplasts were evaluated using fluorescent microscopy. As can be seen in FIG. 17, the SD-29 treated protoplasts prevented accumulation of $H_2O_2$-induced reactive oxygen species.

Example 9

Figure 18:
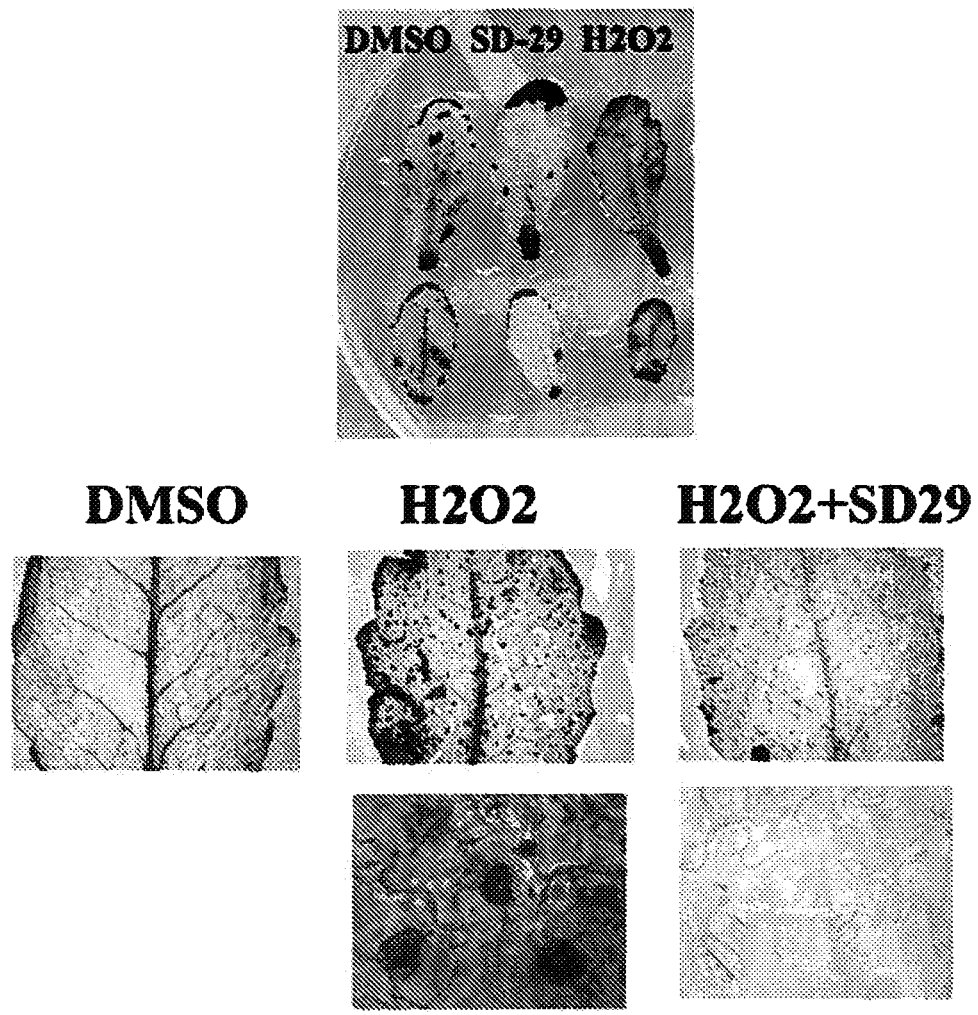
FIG. 18 includes photographs showing that SD-29 prevents $H_2O_2$ (ROS) accumulation as indicated by dark spots on the leaves.

*Arabidopsis* leaves were treated with 5 μM $H_2O_2$ and 3,3'-diaminobenzidene (DAB) with and without SD-29 overnight. A control included DMSO only (included in the same volume as SD-29). The leaves were photographed and are shown in FIG. 18. The brown spots indicate sites of accumulation of H₂O₂. As can be seen in the photographs, SD-29 prevents H₂O₂ accumulation in the leaves.

Example 10

Figure 19:
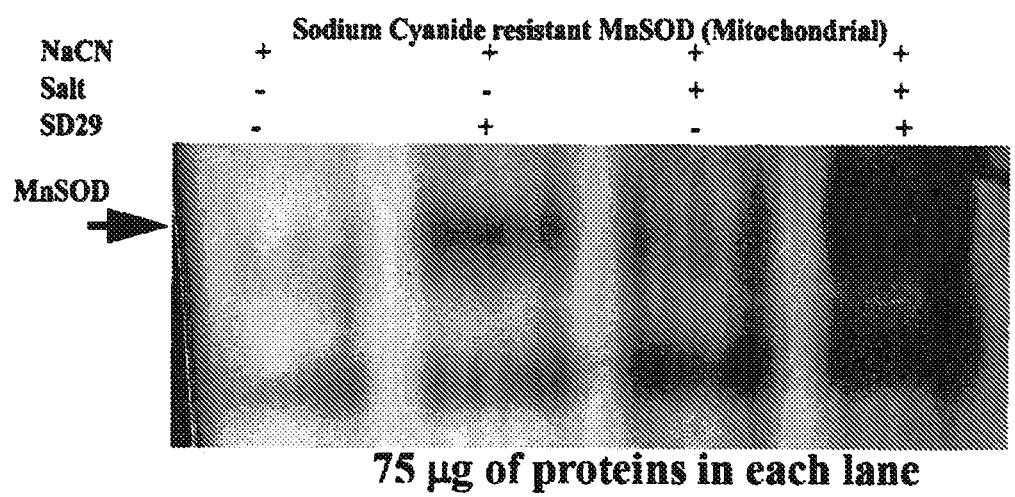
FIG. 19 includes a photograph of a gel showing that SD-29 upregulates MnSOD activity in rice during salt stress conditions.

Native gel assays were done as described for FIG. 8 for the evaluation of whether specific ROS detoxifying enzyme SOD (mitochondrial) is upregulated by the application of SD29 during the salt stress conditions. The presence of NaCN in the gel activity buffer ensures development of the NaCN resistant Mn-SOD band. As shown in FIG. 19, it was found that SD-29 upregulates MnSOD activity as well in rice. This suggests that SD-29 plays a role in mitochondria derived specific ROS detoxification.

The foregoing descriptions are not intended to represent the only forms of the compounds and methods of modulating environmental stresses. The percentages provided herein are by weight unless stated otherwise. Changes in form and in proportion of parts, as well as the substitution of equivalents, are contemplated as circumstances may suggest or render expedient. Similarly, while compounds and methods have been described herein in conjunction with specific embodiments, many alternatives, modifications, and variations will be apparent to those skilled in the art in light of the foregoing description.

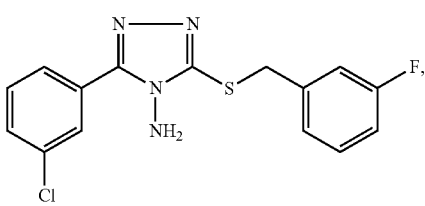

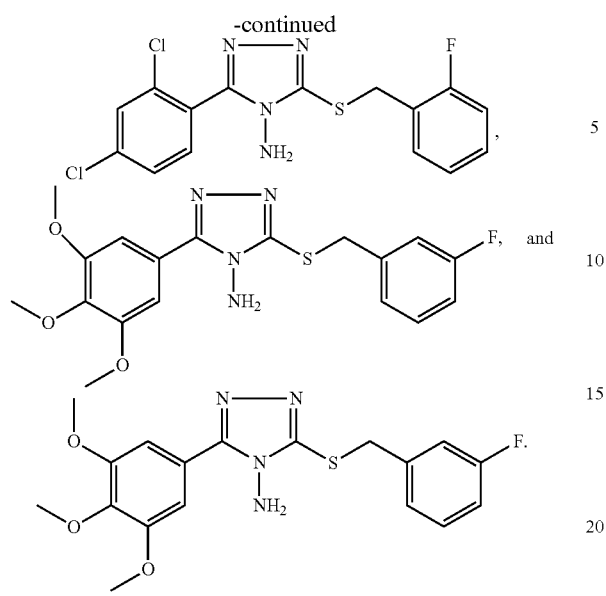

What is claimed is:

1. A method for modulating environmental stress resistance in a plant by increasing or decreasing the phosphorylation of Tyr248 in RACK1A in the plant, the method comprising applying to the plant or part thereof, area of cultivation, or combination thereof an amount of a compound effective to modulate Tyr248 phosphorylation of RACK1A in the plant in response to exposure to the environmental stress,
   wherein the environmental stress is at least one selected from the group consisting of high light intensity, high soil salinity, low soil moisture, and heat,
   wherein the compound is selected from any one of the following:

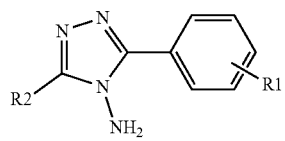

(1)

or an agriculturally acceptable salt thereof,
wherein
$R_1$ is halogen; lower halo-alkyl comprising $C_1$ to $C_{10}$ halo-alkyl; lower alkoxy comprising $C_1$ to $C_{10}$ alkoxy; or lower halo-alkoxy, and R₂ is a lower alkyl comprising C₁ to C₁₀ alkyl; -lower halo-alkyl comprising C₁ to C₁₀ halo-alkyl; —SH; or —N(R₇)x, with the proviso that when R₂ is —SH, R₁ is not —Cl, —F, or —OH,
wherein
x is 1 or 2 and
R₇ is N, —OH, lower alkyl, lower halo-alkyl, lower alkoxy, lower halo-alkoxy; an aromatic group; —SCH₂CONR₈; —SCH₂COOR₈; or —SCH₂COR₈,
wherein
R₈ is —H, lower alkyl, or lower halo-alkyl;

(2)

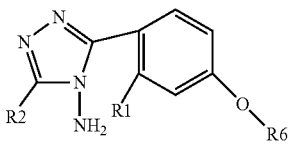

or an agriculturally acceptable salt thereof, wherein
R₁ is a halogen; OH; lower halo-alkyl comprising C₁ to C₁₀ halo-alkyl; lower alkoxy comprising C₁ to C₁₀ alkoxy; -or lower halo-alkoxy;
R₂ is a lower alkyl comprising C₁ to C₁₀ alkyl; lower halo-alkyl comprising C₁ to C₁₀ halo-alkyl; —SH; or —N(R₇)ₓ,
wherein
x is 1 or 2;
R₆ is lower alkyl or —CF₃;
R₇ is N, —OH, lower alkyl, lower halo-alkyl, lower alkoxy, lower halo-alkoxy; an
aromatic group; —SCH₂CONR₈; —SCH₂COOR₈; or —SCH₂COR₈; and R₈ is —H, lower alkyl, or lower halo-alkyl;

(5)

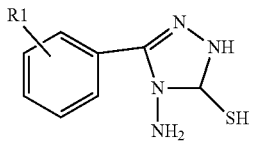

or an agriculturally acceptable salt thereof,
wherein R₁ is halogen; lower alkoxy comprising C₁ to C₁₀ alkoxy; or lower halo-alkoxy, with the proviso that R₁ is not —Cl or —F; or
or an agriculturally acceptable salt thereof,
wherein R₁ is halogen; lower alkyl comprising C₂ to C₁₀ alkyl; lower alkoxy comprising C₁ to C₁₀ alkyl; or lower halo-alkoxy, with the proviso that R₁ is not —Cl or —F; or (6)

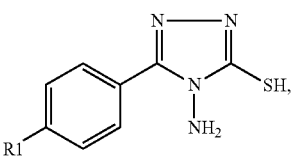

or an agriculturally acceptable salt thereof,
wherein R₁ is a halogen, lower alkyl, or lower alkoxy, with the proviso that R₁ is not —Cl, —F, a methyl group, or an ethyl group; or is a compound represented by any of the following formulae:

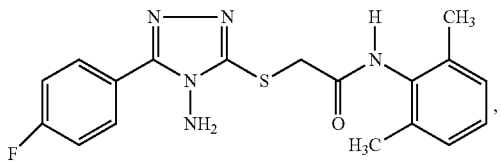

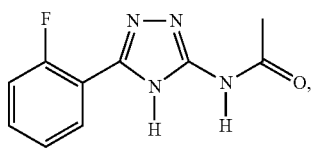

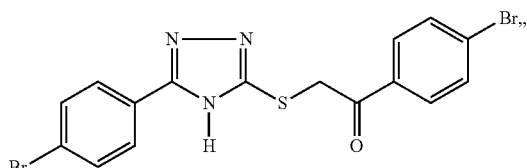

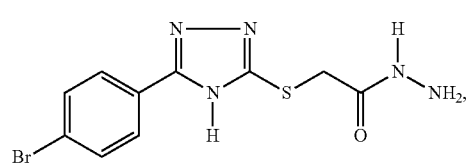

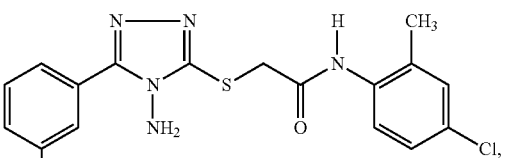

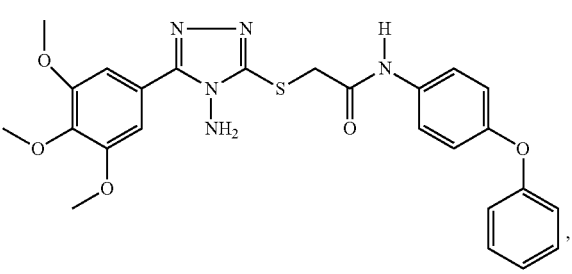

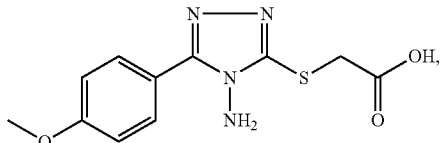

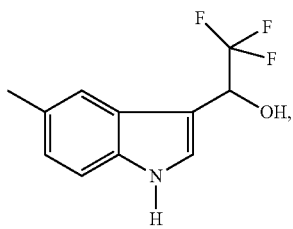

2. The method of claim 1, wherein the plant material comprises foliage, stem, roots, soil, or a combination thereof.

3. The method according to claim 1, wherein the compound is diluted in liquid media prior to application to the plant or area of cultivation.

4. The method of claim 1, wherein the compound is selected from any one of the following:

[chemical structures]

5. The method according to claim 1, wherein the compound is a compound represented by formula (1), formula (2), or formula (5).

6. The method according to claim 1, wherein the compound is a compound represented by formula (6):

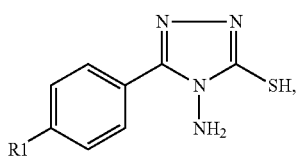

or an agriculturally acceptable salt thereof, wherein R$_1$ is a halogen, lower alkyl, or lower alkoxy, with the proviso that R$_1$ is not —Cl, —F, a methyl group, or an ethyl group.

7. The method according to claim 5, wherein the compound is represented by formula (1) and R$_1$ is lower halo-alkyl comprising C$_1$ to C$_{10}$ halo-alkyl; lower alkoxy comprising C$_1$ to C$_{10}$ alkoxy C$_2$ to C$_{10}$ alkoxy; or lower halo-alkoxy.

8. The method according to claim 1, wherein the compound is selected from the group of compounds represented by the following formulae:

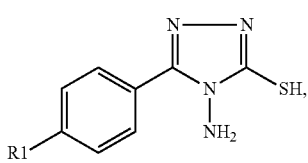

or an agriculturally acceptable salt thereof, wherein R$_1$ is a halogen, lower alkyl, or lower alkoxy, with the proviso that R$_1$ is not —Cl, —F, a methyl group, or an ethyl group, or is a compound represented by the following formula:

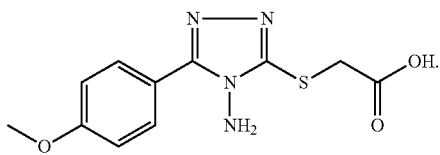 [SMILES: COc1ccc(-c2nnc(SCC(=O)O)n2N)cc1]

9. The method according to claim 8, wherein R$_1$ is a halogen, with the proviso that R$_1$ is not —Cl or —F.

10. The method according to claim 1, wherein the compound is represented by the following formula:

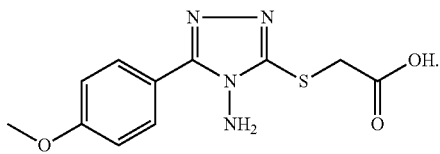 [SMILES: COc1ccc(-c2nnc(SCC(=O)O)n2N)cc1]

11. An agricultural composition effective in modulating environmental stress resistance in a plant by increasing or decreasing the phosphorylation of Tyr248 in RACK1A in the plant, the composition comprising
  a compound present in an amount effective to modulate Tyr248 phosphorylation of RACK1A in the plant in response to exposure to the environmental stress when said composition has been applied to the plant or part thereof, area of cultivation, or combination thereof, said environmental stress comprising at least one of high light intensity, high soil salinity, low soil moisture, and heat, and
  a liquid carrier for the compound, wherein the compound that is represented by

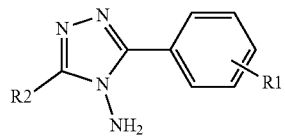

or an agriculturally acceptable salt thereof, wherein
R$_1$ is halogen; OH; lower halo-alkyl comprising C$_1$ to C$_{10}$ halo-alkyl; lower alkoxy comprising C$_1$ to C$_{10}$ alkoxy; or lower halo-alkoxy, and
R$_2$ is a lower alkyl comprising C$_1$ to C$_{10}$ alkyl; lower halo-alkyl comprising C$_1$ to C$_{10}$ halo-alkyl; —SH; or —N(R$_7$)$_x$, with the proviso that when R$_2$ is —SH, R$_1$ is not —Cl, —F, or —OH,
wherein
x is 1 or 2 and
R$_7$ is N, —OH, lower alkyl, lower halo-alkyl, lower alkoxy, lower halo-alkoxy; an aromatic group; —SCH$_2$CONR$_8$; —SCH$_2$COOR$_8$; or —SCH$_2$COR$_8$,
wherein
R$_8$ is —H, lower alkyl, or lower halo-alkyl;

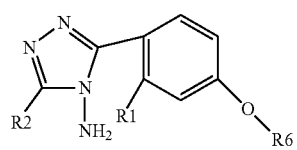

or an agriculturally acceptable salt thereof, wherein
R$_1$ is a halogen; OH; lower halo-alkyl comprising C$_1$ to C$_{10}$ halo-alkyl; lower alkoxy comprising C$_1$ to C$_{10}$ alkoxy; or lower halo-alkoxy; R$_2$ is a lower alkyl comprising C$_1$ to C$_{10}$ alkyl; lower halo-alkyl comprising C$_1$ to C$_{10}$ halo-alkyl; —SH; or —N(R$_7$)$_x$,
wherein
x is 1 or 2;
R$_6$ is lower alkyl or —CF$_3$;
R$_7$ is N, —OH, lower alkyl, lower halo-alkyl, lower alkoxy, lower halo-alkoxy; an aromatic group; —SCH$_2$CONR$_8$; —SCH$_2$COOR$_8$; or —SCH$_2$COR$_8$; and
R$_8$ is —H, lower alkyl, or lower halo-alkyl;

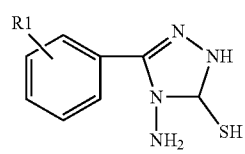

or an agriculturally acceptable salt thereof,
wherein R$_1$ is halogen; lower alkoxy comprising C$_1$ to C$_{10}$ alkoxy; or lower halo-alkoxy, with the proviso that R$_1$ is not —Cl or —F; or

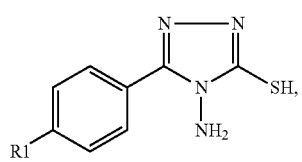

(6)

or an agriculturally acceptable salt thereof, wherein $R_1$ is a halogen, lower alkyl, or lower alkoxy, with the proviso that $R_1$ is not —Cl, —F, a methyl group, or an ethyl group; or is a compound represented by any of the following formulae:

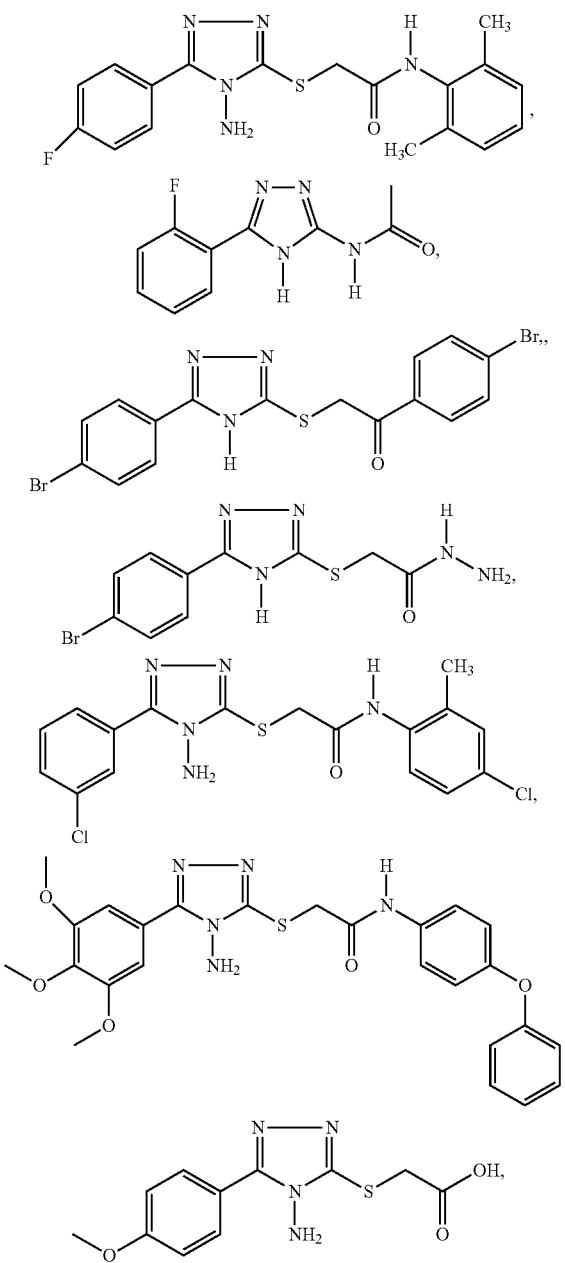

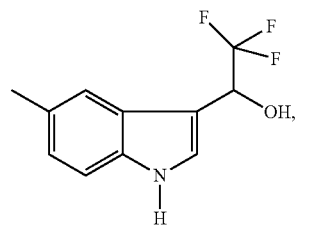

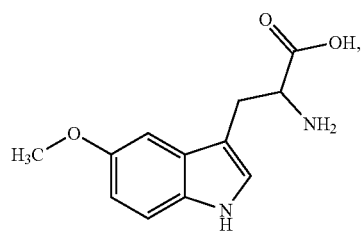

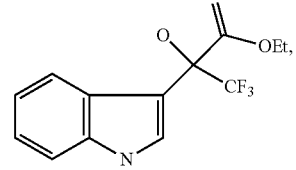

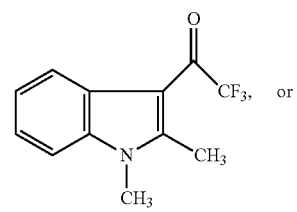

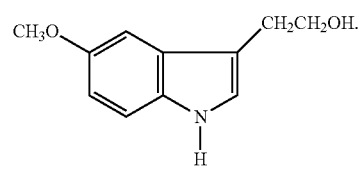

12. A method for modulating environmental stress resistance in a plant by increasing or decreasing the phosphorylation of Tyr248 in RACK1A in the plant, the method comprising applying to the plant or part thereof, area of cultivation, or combination thereof an amount of a compound effective to modulate Tyr248 phosphorylation of RACK1A in the plant in response to exposure to the environmental stress, wherein the environmental stress is at least one selected from the group consisting of high light intensity, high soil salinity, low soil moisture, and heat, wherein the compound is selected from any one of the following:

SEQUENCE LISTING

<160> NUMBER OF SEQ ID NOS: 2

<210> SEQ ID NO 1
<211> LENGTH: 1259
<212> TYPE: DNA
<213> ORGANISM: Arabidopsis thaliana

<400> SEQUENCE: 1

```
ttctttgtat ttccgcctcc cccgagaaaa cgaaaaccct agtttcagag gcatctccag      60
acaccgaaaa tggcggaagg actcgttttg aagggcacca tgcgtgcaca cactgacatg     120
gtgacggcaa tcgccacccc aatcgataac gcagacatca tcgtctcagc ttcccgcgac     180
aaatccatca ttttgtggaa actcaccaag gacgacaaag cctacggtgt agctcagagg     240
cgtctcactg gtcactctca cttcgttgag gatgttgttc tctcctccga tggacaattc     300
gcgctttccg gcagctggga cggcgagctc cgtctttggg atcttgctgc tggtgtctcc     360
actcgtagat tcgttggaca caccaaggac gtgctctccg tcgccttctc actcgacaac     420
cgtcagatcg tctctgcatc tcgtgaccgt acgatcaagc tgtggaacac tcttggtgag     480
tgcaagtaca ccatttcaga aggtggtgag ggacaccgtg attgggttag ctgcgtcaga     540
ttcagcccta acacgcttca gccgacgatt gtatctgctt cgtgggacaa gaccgtgaaa     600
gtgtggaacc tttcgaactg caagctcaga tcgactcttg ctggtcacac cggttacgtg     660
agcactgtgg ctgtatcacc tgatggttct ctttgtgcaa gtggaggcaa agacggtgtt     720
gttttgctgt gggatttggc tgaggggaag aagctttact ctcttgaagc taactctgtg     780
atccatgctc tttgcttcag tcccaacagg tactggctct gtgctgcaac tgaacatggt     840
attaagattt gggaccttga gagcaagagc attgttgagg atttgaaggt tgatctcaag     900
gctgaggctg aaaaggctga caacagtggt cctgctgcca ccaagaggaa ggttatttac     960
tgcacaagcc ttaactggag cgctgatgga agcaccctct tcagtggtta caccgatgga    1020
gtcattagag tttggggtat tggtcgttac tagtaatctc atcacttgtg ctgtcgttgc    1080
tctctgctat ctgcttgttg gttttatcta tcacttatgt ttttatcgac aactcatgaa    1140
gtaccttgag gttttttggaa ggatgtttgt tttcttgtca atctaggttt ttgcttcttt    1200
atcttatcgt tcgagatctt ggttttttaga gttacttctc ccgaaaaaaa aaaaaaaaa    1259
```

<210> SEQ ID NO 2
<211> LENGTH: 327
<212> TYPE: PRT
<213> ORGANISM: Arabidopsis thaliana

<400> SEQUENCE: 2

```
Met Ala Glu Gly Leu Val Leu Lys Gly Thr Met Arg Ala His Thr Asp
 1               5                  10                  15
```

```
Met Val Thr Ala Ile Ala Thr Pro Ile Asp Asn Ala Asp Ile Ile Val
            20                  25                  30
Ser Ala Ser Arg Asp Lys Ser Ile Ile Leu Trp Lys Leu Thr Lys Asp
        35                  40                  45
Asp Lys Ala Tyr Gly Val Ala Gln Arg Arg Leu Thr Gly His Ser His
    50                  55                  60
Phe Val Glu Asp Val Val Leu Ser Ser Asp Gly Gln Phe Ala Leu Ser
65                  70                  75                  80
Gly Ser Trp Asp Gly Glu Leu Arg Leu Trp Asp Leu Ala Ala Gly Val
                85                  90                  95
Ser Thr Arg Arg Phe Val Gly His Thr Lys Asp Val Leu Ser Val Ala
            100                 105                 110
Phe Ser Leu Asp Asn Arg Gln Ile Val Ser Ala Ser Arg Asp Arg Thr
        115                 120                 125
Ile Lys Leu Trp Asn Thr Leu Gly Glu Cys Lys Tyr Thr Ile Ser Glu
130                 135                 140
Gly Gly Glu Gly His Arg Asp Trp Val Ser Cys Val Arg Phe Ser Pro
145                 150                 155                 160
Asn Thr Leu Gln Pro Thr Ile Val Ser Ala Ser Trp Asp Lys Thr Val
                165                 170                 175
Lys Val Trp Asn Leu Ser Asn Cys Lys Leu Arg Ser Thr Leu Ala Gly
            180                 185                 190
His Thr Gly Tyr Val Ser Thr Val Ala Val Ser Pro Asp Gly Ser Leu
        195                 200                 205
Cys Ala Ser Gly Gly Lys Asp Gly Val Val Leu Leu Trp Asp Leu Ala
    210                 215                 220
Glu Gly Lys Lys Leu Tyr Ser Leu Glu Ala Asn Ser Val Ile His Ala
225                 230                 235                 240
Leu Cys Phe Ser Pro Asn Arg Tyr Trp Leu Cys Ala Ala Thr Glu His
                245                 250                 255
Gly Ile Lys Ile Trp Asp Leu Glu Ser Lys Ser Ile Val Glu Asp Leu
            260                 265                 270
Lys Val Asp Leu Lys Ala Glu Ala Glu Lys Ala Asp Asn Ser Gly Pro
        275                 280                 285
Ala Ala Thr Lys Arg Lys Val Ile Tyr Cys Thr Ser Leu Asn Trp Ser
    290                 295                 300
Ala Asp Gly Ser Thr Leu Phe Ser Gly Tyr Thr Asp Gly Val Ile Arg
305                 310                 315                 320
Val Trp Gly Ile Gly Arg Tyr
                325
```